(12) United States Patent
Menke-Berg et al.

(10) Patent No.: US 11,673,826 B2
(45) Date of Patent: Jun. 13, 2023

(54) DECORATIVE COATING HAVING INCREASED IR REFLECTION

(71) Applicants: SCHOTT AG, Mainz (DE); SCHOTT GEMTRON CORPORATION, Sweetwater, TN (US)

(72) Inventors: Yvonne Menke-Berg, Wiesbaden (DE); Vera Steigenberger, Bischofsheim (DE); Adam O'Ryan, Sweetwater, TN (US); Matthew Moose, Sweetwater, TN (US); Michael Schwall, Knoxville, TN (US); Stephanie Mangold, Klein-Winternheim (DE); Matthias Bockmeyer, Mainz (DE)

(73) Assignee: SCHOTT AG, Mainz (DE)

( * ) Notice: Subject to any disclaimer, the term of this patent is extended or adjusted under 35 U.S.C. 154(b) by 320 days.

(21) Appl. No.: 16/881,374

(22) Filed: May 22, 2020

(65) Prior Publication Data

US 2020/0354264 A1 Nov. 12, 2020

Related U.S. Application Data

(63) Continuation of application No. PCT/EP2018/082247, filed on Nov. 22, 2018.
(Continued)

(30) Foreign Application Priority Data

Nov. 22, 2017 (DE) .................... 10 2017 127 624.6

(51) Int. Cl.
*C03C 17/00* (2006.01)
*F24C 15/04* (2006.01)
(Continued)

(52) U.S. Cl.
CPC ............ *C03C 17/007* (2013.01); *C03C 3/078* (2013.01); *C03C 3/083* (2013.01); *C03C 3/085* (2013.01);
(Continued)

(58) Field of Classification Search
None
See application file for complete search history.

(56) References Cited

U.S. PATENT DOCUMENTS

| 3,892,223 A * | 7/1975 | McKelvey ............. F24C 15/04 126/200 |
| 5,898,180 A | 4/1999 | Venkataramani |

(Continued)

FOREIGN PATENT DOCUMENTS

| CN | 104334684 | 2/2015 |
| DE | 10014373 | 12/2003 |

(Continued)

OTHER PUBLICATIONS

Heubach, HEUCODUR—Brown 869. (Year: 2016).*
(Continued)

*Primary Examiner* — David Sample
(74) *Attorney, Agent, or Firm* — Ruggiero McAllister & McMahon LLC

(57) ABSTRACT

A coated glass or glass ceramic substrate includes a substrate with a surface area and a coating on that surface area. The coating includes a glass matrix and IR-reflecting pigments. The IR-reflecting pigments have a TSR value of at least 20%, as determined according to ASTM G 173. The coating, at a wavelength of 1500 nm, exhibits a remission of at least 35%, as measured according to ISO 13468.

25 Claims, 10 Drawing Sheets
(1 of 10 Drawing Sheet(s) Filed in Color)

Related U.S. Application Data

(60) Provisional application No. 62/712,615, filed on Jul. 31, 2018.

(51) Int. Cl.

| | | |
|---|---|---|
| C03C 3/078 | (2006.01) | |
| C03C 3/083 | (2006.01) | |
| C03C 3/085 | (2006.01) | |
| C03C 3/087 | (2006.01) | |
| C03C 3/089 | (2006.01) | |
| C03C 3/091 | (2006.01) | |
| C03C 3/093 | (2006.01) | |
| C03C 3/11 | (2006.01) | |
| C03C 3/112 | (2006.01) | |
| C03C 3/115 | (2006.01) | |
| C03C 3/118 | (2006.01) | |
| C03C 4/02 | (2006.01) | |
| C03C 8/02 | (2006.01) | |
| C03C 8/04 | (2006.01) | |
| C03C 8/06 | (2006.01) | |
| C03C 8/14 | (2006.01) | |
| C03C 10/00 | (2006.01) | |
| C03C 10/16 | (2006.01) | |
| C03C 11/00 | (2006.01) | |

(52) U.S. Cl.
CPC .............. *C03C 3/087* (2013.01); *C03C 3/089* (2013.01); *C03C 3/091* (2013.01); *C03C 3/093* (2013.01); *C03C 3/11* (2013.01); *C03C 3/112* (2013.01); *C03C 3/115* (2013.01); *C03C 3/118* (2013.01); *C03C 4/02* (2013.01); *C03C 8/02* (2013.01); *C03C 8/04* (2013.01); *C03C 8/06* (2013.01); *C03C 8/14* (2013.01); *C03C 10/0018* (2013.01); *C03C 10/0027* (2013.01); *C03C 10/0054* (2013.01); *C03C 10/16* (2013.01); *C03C 17/008* (2013.01); *F24C 15/04* (2013.01); *C03C 11/007* (2013.01); *C03C 2204/00* (2013.01); *C03C 2207/00* (2013.01); *C03C 2217/425* (2013.01); *C03C 2217/452* (2013.01); *C03C 2217/485* (2013.01)

(56) References Cited

U.S. PATENT DOCUMENTS

| | | |
|---|---|---|
| 2003/0019864 A1 | 1/2003 | Krause |
| 2005/0092318 A1 | 5/2005 | Haustein |
| 2010/0028629 A1 | 2/2010 | Anton |
| 2010/0047556 A1 | 2/2010 | Bockmeyer |
| 2010/0115996 A1 | 5/2010 | Werdecker |
| 2013/0266781 A1 | 10/2013 | Hoffmann |
| 2013/0273320 A1 | 10/2013 | Bockmeyer |
| 2015/0024145 A1 | 1/2015 | Bockmeyer |
| 2015/0037507 A1 | 2/2015 | Bockmeyer |
| 2015/0291772 A1 | 10/2015 | Okada |
| 2015/0369492 A1 | 12/2015 | Lecomte |
| 2017/0210660 A1 | 7/2017 | Binhussain |
| 2017/0240459 A1 | 8/2017 | Gioffreda |
| 2019/0152845 A1 | 5/2019 | Rufino |

FOREIGN PATENT DOCUMENTS

| | | | |
|---|---|---|---|
| DE | 102007030698 | 1/2009 | |
| DE | 102008031426 | 1/2010 | |
| DE | 102008040636 | 1/2010 | |
| DE | 102010031866 | 1/2012 | |
| DE | 102011115379 | 4/2013 | |
| DE | 202014010348 | 8/2015 | |
| DE | 102015103461 | 9/2016 | |
| EP | 1293726 | 3/2003 | |
| EP | 1401781 | 3/2004 | |
| EP | 1267593 | 3/2005 | |
| EP | 2860226 | 4/2015 | |
| WO | WO-9748649 A1 * | 12/1997 | ............ C03C 17/36 |
| WO | 0037362 | 6/2000 | |
| WO | 02102734 | 12/2002 | |
| WO | 2010081531 | 7/2010 | |
| WO | 2012167932 | 12/2012 | |
| WO | 2013156617 | 10/2013 | |
| WO | 2017068368 | 4/2017 | |
| WO | 2017216483 | 12/2017 | |

OTHER PUBLICATIONS

Green Series Pigment 50 Cobalt Titanate Green Spinel (Year: 2013).*

Weissmann Rudolf, "Fundamental Properties of Float Glass Surfaces," Glass Processing Days. (Year: 1997).*

International Search Report for corresponding International Application PCT/EP2018/082247 dated Mar. 6, 2019.

English translation of International Preliminary Report on Patentability dated May 22, 2020 for corresponding International Application PCT/EP2018/082247, 7 pages.

Zunning, "Fundamentals of optoelectronic countermeasures", Beijing, Beijing Institute of Technology Press, 2017.1, ISBN 978-7-5682-3617-1, 3 pages.

* cited by examiner

SCE on color side with black background

DECORATIVE COATING HAVING INCREASED IR REFLECTION

CROSS REFERENCE TO RELATED APPLICATIONS

This application is a continuation of International Application PCT/EP2018/082247 filed Nov. 22, 2018, which claims benefit of both U.S. Application 62/712,615 filed Jul. 31, 2018 and German Application 10 2017 127 624.6 filed Nov. 22, 2017, the entire contents of all of which are incorporated by reference herein

BACKGROUND

1. Field of the Invention

The invention generally relates to a coating with improved IR reflectance as well as to a paste and a method for producing a correspondingly coated substrate. More particularly, the invention relates to a decorative coating with improved IR reflectance, to a glass substrate coated accordingly, and to a household appliance comprising such a coated glass substrate.

2. Description of Related Art

In household appliances such as cooking ovens, but also in fireplaces, there is naturally and intentionally a considerable amount of heat being generated during operation. However, at least in the case of cooking ovens, the major portion of the heat should remain within the respective appliance. Also, viewing windows of fireplaces should not be heated unnecessarily in order to avoid hazards to the user.

In the case of a cooking oven, for example, the temperature distribution within the oven should be as uniform as possible during operation. For this purpose as well as for energy saving purposes it is necessary that the heat remains within the device to the greatest possible extent. In addition, with regard to user safety it is desirable that the respective outer components, in particular the oven door, heat up to the lowest possible degree. At the same time, however, the user should be able to observe the cooking or baking process during operation.

Therefore, cooking oven doors usually have a structure consisting of a plurality of viewing window glass sheets arranged one behind the other. To increase the thermal insulation effect, the individual glass sheets are arranged with a spacing therebetween so that the air prevailing between the glass sheets reduces heat conduction by convection and consequently is effective as an insulation layer.

In addition to heat conduction by convection, heat conduction in electric ovens or fireplaces is also mediated by the heat radiation generated during operation. For example, the heating elements of an electric oven emit heat in the form of long wavelengths electromagnetic radiation, and such thermal radiation may approximately be regarded as black body radiation. Thus, the wavelength of the radiation emitted by the heating elements is a function of the respective temperature, so that the maximum intensity of the radiation is in the range from 1.5 µm to 4.5 µm, in particular in the range from 2.5 µm to 10 µm, depending on the operating temperature.

Various approaches have been described in the prior art for minimizing heat loss and for minimizing heating of the oven door.

Conventional cooking ovens typically have doors comprising at least three glass sheets spaced apart from one another, with the intermediate glass sheet coated on both sides with a coating comprising a transparent conductive oxide, which is also known as a low-E layer. This coating is intended to cause reflection of the long wavelengths IR radiation and so to counteract heat loss through thermal radiation. However, a drawback thereof lies in the rather high costs of the conductive oxides.

Another disadvantage of the coating is that the oxides used for this purpose, such as indium tin oxide, fluorine tin oxide, aluminum zinc oxide, and antimony tin oxide do not exhibit high scratch resistance. Furthermore, the reflection behavior of such oxides is often optimized for heat radiation in the range of solar heat radiation, since layers of this type were adopted from building glazing.

The outer sheet, i.e. the glass sheet defining the outer surface of the oven door, is usually additionally provided with a decorative layer. This decorative layer is usually applied as an enamel or glass flux layer and preferably contains black, brown, and/or white pigments.

The decorative layer is usually applied to the glass sheet in the form of a dot or raster pattern.

Patent application WO 2017/216483 A1 discloses a coated sheet glass having a multilayer coating comprising a layer that contains a transparent conductive oxide and, deposited thereon, a black enamel layer as a decorative layer. The enamel layer covers 10 to 60% of the sheet glass surface. The pigment particles in the enamel layer have a particle size ranging from 500 nm to 10 µm, which is within the wavelength range of thermal radiation, so that the corresponding electromagnetic radiation can be scattered on the pigment particles. At the same time, however, the large particle size is disadvantageous with regard to the processability of the pigments. Such enamel coatings are usually applied to the substrate by screen printing. However, in the case of rather large particle sizes, screens with a correspondingly lower thread density have to be used, which in turn may considerably limit the resolution of the printed decor.

The pigment layer here serves to enable an improved toughening process, essentially by the fact that wavelengths in the far infrared corresponding to a temperature of more than 600° C. can be used to heat the glass and hence contribute to enhanced thermal toughening of the glass including the double layer containing the conductive pigments.

Another possibility known from the prior art for reducing heat loss is to provide the oven doors with reflective metal strips, for example silver or aluminum strips, so as to direct heat radiation back into the interior of the oven.

Alternatively or additionally, the door design may include forced cooling by convection.

However, such configurations have a complex structure and are usually costly.

SUMMARY

An object of the invention therefore is to provide a coated glass substrate which exhibits high reflectance or remission, in particular for electromagnetic radiation of a wavelength in the range from 1 to 4 µm, and which does not have or at least mitigates the drawbacks described above. Furthermore, it is an object of the invention to provide a paste and a method for producing such a coated substrate. Another object of the invention is to provide an oven door or fireplace viewing window with improved thermal insulation.

The invention relates to a paste for producing an IR-reflecting layer, in particular on a glass or glass ceramic substrate, comprising at least one IR-reflecting pigment and glass powder. IR-reflecting pigment in particular refers to a pigment which exhibits a remission of at least 50% at a wavelength of 1500 nm. Due to the high remission of infrared (IR) radiation, a large part of the heat radiation is remitted. Remission was determined in compliance with the ISO 13468 measurement standard, here.

Furthermore, the pigment has a TSR value of at least 20%. The TSR (total solar reflectance) value provides information about the percentage of reflected electromagnetic radiation in the wavelength range from 200 nm to 2500 nm and is determined in compliance with the ASTM G 173 measurement standards.

It has been found here, that a high TSR value of the pigments also has an impact on the remission behavior of a coating produced from the paste with regard to the thermal radiation. Here, a high TSR value is advantageous for achieving high remission of thermal radiation, i.e. of electromagnetic radiation in a range from 1 to 4 µm. This is surprising, since the wavelength ranges of thermal radiation and the wavelength range which is relevant for the determination of the TSR value only partially overlap. In particular, the TSR value as the transmittance value for solar radiation relates to the wavelength range from 200 nm to 1000 nm and thus to substantially shorter wavelengths.

According to one embodiment, the paste comprises at least one IR-reflecting pigment with a TSR value of at least 25%. Alternatively or additionally, the pigment exhibits a remission of at least 60% or even at least 70% at a wavelength of 1500 nm, as measured according to ISO 13468.

One embodiment contemplates that the particles of the IR-reflecting pigment have a size distribution with a d50 value in the range from 0.5 µm to 2 µm. The small particle size allows the paste to be applied even with close-meshed screens, for example with screens having a thread count of 77 threads per cm or even 100 threads per cm, so that the paste can be used to produce coatings or decorations with high graphic resolution by screen printing. The following table lists some suitable screens, by way of example but not by way of limitation.

| Screen designation in the text | Number of threads ($cm^{-1}$) | Thread diameter, nominal (µm) | Mesh size (µm) |
|---|---|---|---|
| 77T | 77 | 55 | 67 |
| 90T | 90 | 48 | 55 |
| 100T | 100 | 40 | 37 |

Furthermore, the layer thickness of the coating after firing is determined by the mesh size of the employed screen along with the oil content and powder densities. According to a preferred embodiment, the IR-reflecting pigments have a particle size distribution with a d50 value in the range from 0.8 µm to 1.8 µm.

The particle size used as mentioned above is other than in patent application WO 2017/216483 A1.

In the context of the present disclosure, the pigment layer does not serve to enable an improved toughening process and to exploit wavelengths substantially in the far infrared to heat the glass or glass ceramic of the substrate, rather it is intended to reflect or remit radiation to the best extent possible in order to provide for a coated substrate in which the glass or glass ceramic, respectively, is heated to the lowest extent possible. Within the scope of the present disclosure, reflectance and remission is intended to be as high as possible in a wavelength range that corresponds to a temperature of approximately 150° C. to at most 500° C.

The emitted power at different wavelengths is considered to be in the form of blackbody radiation, in which case the emitted spectrum is defined by specifying the temperature. Consequently, the presently disclosed temperatures can be associated with corresponding spectra of blackbody radiators with high accuracy.

According to another embodiment it is contemplated that the paste comprises a chromium containing IR-reflecting pigment, preferably a chromium containing iron oxide, a chromium containing hematite, and/or a chromium containing spinel. Preferably, the IR-reflecting pigment has a black or black-brown color.

The respective pigments in particular exhibit high thermal stability and high chemical inertness with respect to the glass components of the glass powder in the paste, which is particularly advantageous in view of the firing of the paste for producing the corresponding enamel coating. Thus, according to one embodiment, the maximum possible firing temperature is not limited by the stability of the pigments. In a refinement of the invention, this allows the paste on a glass or glass ceramic substrate to be fired at high temperatures in the range from 500 to 1000° C., so that the glass substrate can be thermally toughed during the firing process of the layer.

According to one exemplary embodiment of the invention, the glass powder contained in the paste has a particle size distribution with a d50 value in a range from 0.1 µm and 3 µm and in particular in a range between 0.1 µm and 2 µm. Such particle sizes ensure a homogeneous distribution of the pigments and the formation of a largely homogeneous glass layer during the firing process.

The glass in the paste preferably contains zinc oxide and/or bismuth oxide. Glass powders which have a zinc oxide content in a range from 0.1 to 70 wt % and in particular a zinc oxide content in a range from 0.1 to 30 wt % have proven to be particularly advantageous. Alternatively or additionally, the glass powder contains 0.1 to 75 wt % and in particular 8 to 75 wt % of bismuth oxide. The amount of zinc oxide or bismuth oxide in the embodiments described above has a particularly advantageous impact on the softening temperature of the glass. According to a refinement of these embodiments, the glass powders have softening points in a range from 500 to 950° C. Preferably, the softening point is below 800° C. or even below 750° C., and most preferably below 680° C., but above 450° C. Due to the low softening points, a homogeneous glass matrix or glass flux is obtained from the glass powder even at low firing temperatures. This allows glass substrates of different glass compositions (and thus different softening points) to be coated with the paste without reducing the viscosity of the glass substrate to be coated during the firing.

Moreover, the content of bismuth oxide in the glass increases the chemical resistance of the respective coating made of the paste.

Since in some embodiments or further refinements the glass matrix or glass flux in the coating of the coated substrate has the same composition as the glass powder in the paste, the specifications regarding the composition of the glass powder also apply accordingly to the composition of the glass matrix in the coating.

According to one embodiment of the invention, the glass powder in the paste or the glass matrix of the corresponding coating has the following composition, in wt %:

| | | |
|---|---|---|
| $SiO_2$ | 30-75, | preferably 44-75 |
| $Al_2O_3$ | 0-25, | preferably 0.2-25, more preferably 2-25 |
| $B_2O_3$ | 0-30, | preferably 1-30, more preferably 5-30 |
| $Li_2O$ | 0-12 | |

-continued

| | | |
|---|---|---|
| Na$_2$O | 0-25, | preferably 0-15 |
| CaO | 0-12 | |
| MgO | 0-9 | |
| BaO | 0-27 | |
| SrO | 0-4 | |
| ZnO | 0-35, | preferably 0-20 |
| Bi$_2$O$_3$ | 0-5 | |
| TiO$_2$ | 0-10, | preferably 0-5 |
| ZrO$_2$ | 0-7 | |
| As$_2$O$_3$ | 0-1 | |
| Sb$_2$O$_3$ | 0-1.5 | |
| F | 0-3 | |
| Cl | 0-1, | preferably 0 |
| H$_2$O | 0-3. | |

The glass preferably has a minimum Al$_2$O$_3$ content of 0.2 wt %, more preferably of at least 2 wt %. Alternatively or additionally, the glass has a B$_2$O$_3$ content of at least 1 wt %, preferably at least 5 wt %.

It was moreover found to be advantageous if the glass contains at least 1 wt % of an alkali oxide selected from the group consisting of Na$_2$O, Li$_2$O, and K$_2$O, or mixtures of these oxides.

Alternatively or additionally, the glass comprises at least 1 wt % of a further oxide or a mixture of oxides selected from the group consisting of CaO, MgO, BaO, SrO, ZnO, ZrO$_2$, and TiO$_2$.

According to another embodiment, the glass has the following composition, in wt %:

| | | |
|---|---|---|
| SiO$_2$ | 6-65, | preferably 10-65, more preferably 15-65 |
| Al$_2$O$_3$ | 0-20 | |
| B$_2$O$_3$ | 0-40, | preferably 1-30, more preferably 3-30 |
| Li$_2$O | 0-12 | |
| Na$_2$O | 0-18 | |
| K$_2$O | 0-17 | |
| CaO | 0-17 | |
| MgO | 0-12 | |
| BaO | 0-38 | |
| SrO | 0-16 | |
| ZnO | 0-70 | |
| TiO$_2$ | 0-5 | |
| ZrO$_2$ | 0-5 | |
| Bi$_2$O$_3$ | 0-75, | preferably 0-60, more preferably 5-60, most preferably 10-60 |
| CoO | 0-5 | |
| Fe$_2$O$_3$ | 0-5 | |
| MnO | 0-10 | |
| CeO$_2$ | 0-3 | |
| F | 0-3 | |
| Cl | 0-1 | |
| H$_2$O | 0-3. | |

In a preferred embodiment of the refinement, the glass has a minimum SiO$_2$ content of 10 wt %, preferably at least 15 wt %. Alternatively or additionally, the glass has a minimum Bi$_2$O$_3$ content of 5 wt %, preferably at least 10 wt %. Alternatively or additionally, the glass contains at least 1 wt %, preferably at least 3 wt % of B$_2$O$_3$. The total content of the alkali oxides Na$_2$O, Li$_2$O, and K$_2$O is preferably at least 1 wt %.

The glass or glass flux contained in the paste of the respective coating may in particular be an alkali-free glass, an alkali-containing glass, a silicate glass, a borosilicate glass, a zinc silicate glass, a zinc borate glass, a zinc borosilicate glass, a bismuth borosilicate glass, a bismuth borate glass, a bismuth silicate glass, a phosphate glass, a zinc phosphate glass, an aluminosilicate glass, or a lithium aluminosilicate glass. According to one embodiment of the invention, the paste comprises glass powders of different glass compositions.

According to one embodiment, the content of the toxicologically questionable components lead, cadmium, mercury, and/or chromium(VI) compounds is less than 500 ppm in the glass.

Preferably, the paste has a content of conductive oxides, in particular of conductive oxides selected from the group consisting of indium tin oxide, fluorine tin oxide, aluminum zinc oxide, and antimony tin oxide of less than 500 ppm. In particular, none of the oxides mentioned above are added to the paste.

According to one embodiment of the invention, the paste comprises 10 to 40 wt % of IR-reflecting pigments, 45 to 85 wt % of glass powder, and 12 to 35 wt % of screen printing medium. Solvents that are preferably used for screen printing coating solutions include solvents with a vapor pressure of less than 10 bar, in particular less than 5 bar, and most preferably less than 1 bar. This may be combinations of water, n-butanol, diethylene glycol monoethyl ether, tripropylene glycol monomethyl ether, terpineol, n-butyl acetate, for example.

Appropriate organic and inorganic additives are used in order to be able to adjust the desired viscosity. Organic additives may include hydroxyethyl cellulose, and/or hydroxypropyl cellulose, and/or xanthan gum, and/or polyvinyl alcohol, and/or polyethylene alcohol, and/or polyethylene glycol, block copolymers, and/or triblock copolymers, and/or tree resins, and/or polyacrylates, and/or polymethacrylates, for example. Screen printing oils that can be used, for example, include the oils listed in the following table:

| Designation | Suppliers | Safety relevant constituents acc. to MSDS |
|---|---|---|
| 650-63 | Johnson Matthey | Terpineol |
| | | p-Menth-1-en-8-ol |
| | | Isotridecanol |
| | | Urea RPW formaldehyde, butylated |
| | | Naphta (mineral oil), hydrosulfurized heavy |
| | | terpineols (mixture of terpene hydrocarbons) |
| | | n-Butanol |
| | | Dioctyl sodium sulfosuccinate |
| | | Dipentene |
| | | Alcohols, C9-C16, ethoxylated formaldehyde |
| BM.2675 | Johnson Matthey | 2-(2-Butoxyethoxy) ethanol |
| | | Alkoxylate polymer |
| 654-63 | Johnson Matthey | 2-Methoxy methylethoxy propanol |
| | | 2-Butoxy ethanol |

| Designation | Suppliers | Safety relevant constituents acc. to MSDS |
|---|---|---|
| 675-63 | Johnson Matthey | p-Menth-1-en-8-ol<br>Terpineols (mixture of terpene hydrocarbons)<br>Dipentene<br>Naphta (mineral oil), hydrosulfurized heavy dioctyl sodium sulfosuccinate<br>D,L-alpha-pinene<br>alpha terpinene |
| 733-63 | Johnson Matthey | 2-(2-Butoxyethoxy)ethanol<br>(2-Methoxymethylethoxy)propanol |
| RM 444 | JM | (2-Methoxymethylethoxy)propanol |
| RM 454 | JM | 2-(2-Butoxyethoxy)ethanol |
| N 485 | Johnson Matthey | p-Menth-1-en-8-ol<br>Urea<br>Terpineols (mixture of terpene hydrocarbons)<br>n-Butanol<br>Dipentene<br>D,L-alpha-pinene<br>alpha terpinene |
| H948 Diluente 21 | Prince Minerals | 2-(2-Butoxyethoxy)ethanol<br>2-Butoxy-ethanol |
| Medium 209 | Prince Minerals | no information |
| Oil-1063S | Okuno | Pine oil |
| Oil 5000 (New) | Okuno (Sirpi) | Terpineol<br>2-(2-Butoxyethoxy)ethanol<br>Rosin Amine (Dehydroabietylamine) |
| Oil 5000 (old) | Okuno | Pine oil<br>Diethylene glycol monobutyl ether<br>Cellulose Resin (2-[4,5-diethoxy-2-(ethoxymethyl)-6-methoxyoxan-3-yl]oxy-6-(hydroxymethyl)-5-methoxyoxane)<br>Rosin, colophony |
| 80 868-MS | Ferro | Tri(propylene glycol) methyl ether |
| 80 3057-ME | Ferro | 1,2,3,4-Tetrahydronaphthalene<br>Pine oil<br>Hydrocarbons, terpene processing by-products<br>Naphthalene<br>Diisononyl phthalate |
| 80 3062-MS | Ferro | Kerosene - unspecified<br>1,2,4-trimethylbenzene<br>2-Butoxy-ethanol<br>1,3,5-trimethylbenzene<br>Diisononyl phthalate |
| MX 54-ME | Ferro | p-Menth-1-en-8-ol<br>Pine oil<br>Colophony<br>p-Metha-1,4(8)diene |
| 80 3057-ME | Ferro | 1,2,3,4-Tetrahydronaphthalene<br>Pine oil<br>Hydrocarbons, terpene processing by-products<br>Naphthalene<br>Diisononyl phthalate |
| 80 392-MD | Ferro | Pine oil<br>Xylene |
| 80 1022-MD | Ferro | (2-Methoxymethylethoxy)propanol |
| 80 3062-MD | Ferro | Kerosene - unspecified<br>1,2,4-trimethylbenzene<br>2-Butoxy-ethanol<br>1,3,5-trimethylbenzene<br>Diisononyl phthalate |

The composition of the paste described above ensures that a coating produced therefrom exhibits high IR reflectance. At the same time, the proportion of screen printing medium ensures good processability of the paste, in particular for processing by screen printing. The paste therefore preferably has a viscosity in the range from 3.5 Pa·s at a shear rate of 200/s to 15 Pa·s at a shear rate of 200/s, most preferably in the range from 4.8 Pa·s at a shear rate of 200/s to 12.8 Pa·s at a shear rate of 200/s.

According to one embodiment of the invention, the paste includes an agent which decomposes upon temperature increase to form a volatile phase. By way of example, this includes agents which release gas. The agents are preferably configured such that their anions form gas within the temperature range of the viscous melt of the glass flux and the cations of the agent are incorporated into the glass matrix without impairing the desired properties. Such agents are also referred to as blowing agents or foaming agents.

Particularly considered as the blowing agents are agents which comprise carbides, carbonates, or hydrogen carbonates and manganese compounds. Substances which are in the form of hydroxides and/or comprise water of crystallization may also be used as blowing agents. For example, this includes salts, clay minerals, borates, or aluminates. Phosphates or sulfates may also be considered as blowing agents. The exemplary blowing agents mentioned can be used alone or in mixtures.

Organic substances may also be used as blowing agents, in addition to the inorganic substances mentioned. For example, this includes substances which at the temperatures considered here decompose while forming gas, in particular tartrates such as potassium hydrogen carbonate, but also sugar, wood dust, wheat flour, or starch. Furthermore, advantageous results were achieved with blowing agents which comprise starch. In particular it has been found that rice starch, corn starch, and potato starch are particularly suitable as blowing agents.

Certain oxides also decompose while releasing a gas, for example cerium(IV) oxide or manganese(IV) oxide.

More generally, blowing or foaming agents are understood to mean agents which decompose upon temperature rise to form at least one substance which is volatile at the decomposition temperature of the blowing agent. Volatile substance in particular refers to a gas. However, it should be noted here that it is possible that the volatile substance produced at the decomposition temperature may have a different state of aggregation after the coated substrate has cooled to room temperature. If, for example, water vapor is formed as a volatile substance from a blowing agent at the decomposition temperature, it is possible that after cooling of the coated substrate there will no longer be water vapor in the pore, but liquid water.

If the paste is exposed to high temperatures, the decomposition of the blowing agent causes formation of pores. A coating which is applied to a substrate using a paste according to the present embodiment will have closed pores. Therefore, it is assumed that the substance that is volatile at the decomposition temperature may be at least partially included in the pores of the coating. However, this does not necessarily have to be in a volatile form. For example, it is also possible for the substance that is volatile at the decomposition temperature to be in the form of a condensate at room temperature.

The spatial configuration or shape of the pores may be controlled by the respective blowing agent that is employed. In this way, porous enamels with pores having a largely symmetrical shape can be obtained, as well as porous enamels with anisotropic pores. For example, in one embodiment of the invention the paste contains calcium carbonate as a blowing agent. In this embodiment, the pores resulting from the firing of the paste have symmetrical or at least largely symmetrical shapes in that the pores are largely spherical and have a circular or at least largely circular cross section. The following table shows various blowing agents and the resulting pore shapes.

| Pore former | Pore size (μm) | Pore shape |
|---|---|---|
| $CaCO_3$ | 5-30 | roundish |
| Sodium hydrogen phosphate | 5-30 | roundish |
| Rice starch | 0.1-5 | elongated |
| Potato starch | 10-15 | ovoid potato-shaped |
| Wheat starch | 2-10 | grain-shaped |

Another embodiment contemplates the use of rice starch as a blowing agent. The porous enamel obtained according to this embodiment has pores with an anisotropic pore shape. The pores will in particular have an ellipsoidal cross-sectional shape in this case.

It has been found here that the coating obtained by this embodiment exhibits IR reflectance that is higher than the IR reflectance in embodiments with non-foamed, i.e. non-porous enamels. This effect is in particular observed in embodiments in which the coating predominantly has pores of a largely spherical shape.

The inventors assume that the coatings including closed pores according to the present disclosure exhibit some IR reflectance so as to cause a reduction in temperature on one side, in particular the non-coated front side of a viewing window (the side facing away from the interior of the cooking oven in the case of a cooking oven door, or the side facing away from the fireplace in the case of a fireplace), for example of a cooking oven viewing window, or of the viewing window of a fireplace or an oven, as compared to a coating which has no pores or only very few pores, especially no or very few closed pores.

The table below gives an exemplary list of suitable blowing agents that can be used as constituents of the paste, alone or in combination.

| | Examples | |
|---|---|---|
| Substance group | Trivial name | Formula |
| Sulfates | plaster | $CaSO_4*2H_2O$ |
| | anhydrite, | $CaSO_4$ |
| | cerium(IV) sulfate hydrate | $Ce(SO_4)_2*2H_2O$ |
| Carbonates | potash | $K_2CO_3$ |
| | limestone | $CaCO_3$ |
| | magnesite | $MgCO_3$ |
| Phosphates | | $Na_4P_2O_7*10H_2O$ |
| | | $Na_2H_2P_2O_7*2H_2O$ |
| | | $NaHPO_4*2H_2O$ |
| Borates | borax | $Na_2[B_4O_5(OH)_4]*8H_2O$ |
| Manganites | potassium permanganate | $KMnO_4$ |
| Silicates | clay minerals, e.g. kaolinite | $Al_4[(OH)_8Si_4O_{10}]$ |
| Carbides | silicon carbide | SiC |
| | calcium carbide | $CaC_2$ |
| Organic substances | potassium hydrogen tartrate wheat flour carbohydrate, e.g. sugar wood dust | $KC_4H_5O_6$ |
| Elements | carbon | C |
| Oxides | cerium(IV) oxide | $CeO_2$ |
| | manganese(IV) oxide | $MnO_2$ |
| | silica gel | $SiO_2*xH_2O$ |
| Inorganic-organic mixtures | comprising baking powder, disodium phosphate, sodium hydrogen carbonate, starch | |

According to one embodiment of this refinement, the pastes for producing a porous IR-reflecting coating contain an amount of blowing agent in a range from 5 to 30 vol %, preferably from 5 to 15 vol %. Blowing agent contents in this range have proven to be particularly advantageous with regard to the IR reflectance of the paste obtained therefrom. It may be assumed here that the interfaces of the pores in the coating provide structural elements which cause an increase in IR reflectance, for example due to scattering effects. It may be assumed that these scattering effects arise in particular in coatings with closed pores. On the other hand, high contents of blowing agents in the paste might cause open pores.

In a further embodiment of the invention it is contemplated that the paste contains at least one further, second IR-reflecting pigment. The second IR-reflecting pigment is preferably selected from the group consisting of cobalt chromite spinel, indium manganese yttrium oxide, niobium sulfur tin oxide, tin zinc titanate, cobalt titanate spinel. The amount of the second IR-reflecting pigment in the paste is preferably from 0.5 to 15 wt %, more preferably from 3.5 to 12.5 wt %.

According to one embodiment, a volume ratio between the volume of the second pigment and the volume of the first pigment is from 0.03 to 0.6, preferably from 0.05 to 0.56, and most preferably from 0.14 to 0.47.

The invention furthermore relates to a glass or glass ceramic substrate comprising a surface area that is provided with a coating. Coating in particular also refers to a surface area which includes surface diffusion of the coating into near-surface areas of the substrate. Thus, the coating may also include diffusion layers at the boundary between the coating and the substrate. The coating includes a glass matrix and an IR-reflecting pigment, and the IR-reflecting pigment has a TSR value of at least 20%, as determined according to ASTM G 173. Furthermore, the coating exhibits a remission of at least 35% at a wavelength of 1500 nm, as measured according to the ISO 13468 measurement standard.

It has been found in this case that a high TSR value of the pigments also has an impact on the remission behavior of the produced coating with regard to heat radiation. Here, a high TSR value has proven to be advantageous for the remission of heat radiation in a temperature range from 200 to 475° C. This is surprising, since the corresponding wavelength for the temperature range stated above has its maximum in a range from 1 µm to 4 µm, whereas the TSR value relates to the solar spectrum with significantly shorter wavelengths in a range from 200 nm to 1000 nm. According to a preferred embodiment, the pigment has a TSR value of at least 25%.

The pigments are homogeneously distributed in the glass matrix, also referred to as glass flux below. According to one embodiment, the pigments have a particle size distribution with a d50 value in a range from 0.5 µm to 2 µm, preferably in a range from 0.8 µm to 1.8 µm. According to this embodiment, the pigments therefore have a particle size smaller than the wavelength of the thermal radiation to be reflected. Surprisingly, the layer nevertheless exhibits high remission for radiation in the IR range. For example, at a wavelength of 1500 nm the layers according to the invention exhibit a remission of at least 35%. According to a preferred embodiment, remission is at least 40% or even at least 45% at 1500 nm.

According to one embodiment of the invention, the remission as measured according to the ISO 134 68 standard is at least 35% for the entire wavelength range between 1500 nm and 2500 nm, preferably at least 40%, and most preferably at least 45%.

The proportion of the IR-reflecting pigment in the coating is from 15 to 45 wt %, preferably from 15 to 35 wt %. Such a pigment content ensures adequate IR remission of the coating. At the same time, the pigment content is small enough to allow for a homogeneous distribution of the pigments in the glass matrix and to prevent or at least mitigate aggregation of the pigment particles. The proportion of the glass matrix in the coating is preferably from 55 to 85 wt %.

The extinction of electromagnetic radiation and the degree of remission thereof depends on the layer to be transmitted. Therefore, the coating preferably has a layer thickness in the range from 8 to 35 µm, preferably from 10 to 20 µm. Thus, the coating is thick enough to ensure sufficiently high remission of the IR radiation. At the same time, the maximum layer thickness of 35 µm ensures that mechanical stresses, which arise due to different coefficients of thermal expansion (CTE) of the coating and the substrate, do not adversely affect the mechanical stability of the composite made up of the substrate and the coating, and that the coating can be used independently of the CTE of the substrate.

The use of chromium containing color pigments as an IR-reflecting color pigment has proven to be particularly advantageous. The IR-reflecting color pigment included in the coating preferably comprises a chromium containing iron oxide, a chromium containing hematite, and/or a chromium-iron-nickel spinel. These pigments have proven to be advantageous with regard to their spectral properties, in particular with regard to remission in the IR range, and with regard to their heat resistance. The heat resistance of these pigments is not only relevant for the use of the coated substrate, for example in a cooking oven door or in a fireplace viewing window, but also for the process of making the respective coating, which involves firing at temperatures in a range from 500° C. to 1000° C.

The IR-reflecting pigment preferably has a black or black-brown color. In particular, the IR-reflecting color pigment is selected from the group consisting of the pigments CI Brown 29, CI Green 17, and Black CI 7.

In one embodiment of the invention, the coating includes at least a first pigment and an IR-reflecting pigment. The second, IR-reflecting pigment in particular allows to adjust the color coordinates of the coating. The second, IR-reflecting pigment contained in the coating preferably is one of a cobalt chromite spinel, an indium-manganese-yttrium oxide, a niobium-sulfur-tin oxide, a tin-zinc titanate, and/or a cobalt titanate spinel. What has proven to be particularly advantageous is the use of one of the pigments from the group consisting of C.I. Pigment Blue 36, C.I. Pigment Blue 86, C.I. Pigment Yellow 227, C.I. Pigment Yellow 216, C.I. Pigment Green 26, and C.I. Pigment Green 50.

The content of the second, IR-reflecting pigment in the coating is preferably from 0.75 to 18.5 wt %, most preferably 4.5 and 14 wt %.

According to one embodiment, the volume ratio between the volume of the second pigment and the volume of the first pigment is from 0.03 to 0.6, preferably from 0.05 to 0.56, and most preferably from 0.14 to 0.47.

According to one embodiment of the invention, the content of conductive oxides in the coating is less than 500 ppm. For the purposes of the invention, conductive oxides are in particular understood to mean transparent conductive oxides (TCOs) such as indium tin oxide, fluorine tin oxide, aluminum zinc oxide, and antimony tin oxide.

One embodiment contemplates that the coating is applied directly to the substrate surface. The glass or glass ceramic substrate preferably has no conductive oxide coating. More particularly, there are no coatings comprising conductive oxides deposited on the coating of the invention and/or between the coating of the invention and the glass or glass ceramic substrate.

A further embodiment of the invention contemplates that the coating applied to the glass or glass ceramic substrate has closed pores. By using a coating in which the IR-reflecting pigments are provided within a glass matrix or an enamel having closed pores, the IR reflectance of the coating or of the coated substrate can be further improved. The coating according to the present embodiment is therefore designed so that it comprises closed pores. For this purpose, the suspension or paste according to the present disclosure includes, in addition to the glass powder, an agent which decomposes upon temperature increase to form a volatile substance.

Therefore, by way of example, the coating with closed pores according to the present embodiment may be in the form of a foamed enamel. In this case, the coating is designed as a barrier against the passage of fluids such as water or water vapor. Thus, according to this embodiment, a glass or glass ceramic substrate is provided which, in addition to a high IR reflectance, has a barrier effect against the ingress and passage of fluids.

In the sense of the present disclosure, fluids preferably comprise liquids, in particular water, aqueous liquids, alcohols, liquids based on these liquids or liquids comprising these liquids, such as glass cleaning agents, and/or oils, and water vapor.

According to a further embodiment of this refinement, the coating is a high temperature resistant self-sealing coating. High temperature resistant coating is in particular understood to mean a coating that is stable under temperatures of more than 400° C.

In the present disclosure, a coating is referred to as self-sealing if no further coating is necessary in order to prevent sufficient tightness against the ingress or passage of fluids. Hence, the layer exhibits a barrier effect against fluids. The coating with pores according to this embodiment of the present refinement is thus designed to be self-sealing, for example as a barrier against the passage of fluids.

The porous coating is preferably inorganic. However, the coating may also include organic substances. Usually, these are residues of organic compounds that have been added to the suspension or paste, for example in the form of solvents, and have not completely been decomposed. Also, these may be residues of organically based blowing agents that have not completely been decomposed. According to one embodiment, the coating is substantially inorganic. Here, substantially inorganic means that the coating comprises at least 95 wt % of inorganic constituents, preferably at least 98 wt % of inorganic constituents, and more preferably at least 99 wt % of inorganic constituents. Most preferably, the percentage of inorganic constituents in the coating is 99.9 wt % or more.

According to one embodiment it is contemplated that the resulting coefficient of thermal expansion of the porous coating and the coefficient of thermal expansion of the substrate do not differ from one another by more than $4*10^{-6}$/K in the temperature range from 20° C. to 700° C. Here, the resulting coefficient of thermal expansion of the coating is referred to, since the coating usually constitutes an inhomogeneous material which comprises materials with different expansion coefficients, in particular a glass flux and pores and optionally a pigment and/or other constituents. So, what has not to be considered in this respect is the resulting coefficient of thermal expansion, which results from the structure comprising the pores and the thermal expansion coefficients of the individual constituents of the coating. According to one embodiment, the resulting coefficient of thermal expansion of the coating has a value between at most $9*10^{-6}$/K and at least $3*10^{-6}$/K.

According to a further embodiment of the invention, the substrate comprises a soda-lime glass or a borosilicate glass. The glass is preferably thermally toughened to increase its strength.

According to a further embodiment of the invention it is contemplated that the coating has a refractive index $n_{d,coating}$ ranging from 1.3 to 2, preferably from 1.5 to 1.8.

In a preferred embodiment of the invention the coating is applied to at least one surface of the glass or glass ceramic substrate in a laterally patterned manner. Here, lateral patterning means in particular that only portions of the substrate surface are coated. More particularly, at least 60%, preferably at least 62%, and most preferably at least 65% of at least the respective substrate surface are coated with the coating. The high degree of coverage of the substrate surface with the coating ensures high IR reflectance averaged over the entire substrate surface.

According to a further embodiment of the invention, the coating is applied to at least one of the substrate surfaces in a laterally patterned manner in the form of a raster or dot pattern. The raster or dot pattern of the coating allows to achieve high degrees of coverage and at the same time to retain a view through the substrate.

The invention furthermore relates to household appliances, in particular cooking ovens comprising a substrate coated according to the invention.

According to one aspect of the invention, a cooking oven door is provided comprising a glass sheet structure consisting of at least two glass sheets, in which the substrate coated according to the invention is used as the outer sheet. Here, outer sheet is understood to mean that sheet of the oven door which is in contact with the environment surrounding the cooking oven.

According to one embodiment of the invention, the substrate is a glass substrate and is provided with the coating on one surface thereof. The coated side of the glass substrate faces towards the interior of the oven, and at least 60%, preferably at least 62%, more preferably at least 65%, and most preferably at least 70% of the surface of the glass substrate are covered with the coating. Thus, the glass substrate preferably exhibits a coverage degree of at least 60%.

Already with the coating of the invention alone it is possible to considerably minimize the heat loss attributable to heat radiation, so that further measures to reduce heating of the outer glass sheet can be dispensed with, depending on the application. Thus, according to one embodiment, the outer glass sheet has no further coating comprising any conductive oxide.

According to a further embodiment of the invention it is contemplated that the oven door comprises at least three glass sheets and that the outer and intermediate glass sheets comprise glass substrates coated according to the invention. By using two glass sheets coated according to the invention it is possible to further considerably reduced heat loss attributable to the escape of heat radiation and heating of the oven door on the outer surface thereof. The intermediate glass sheet is preferably provided with the coating of the invention on both sides thereof.

Substrates coated according to the invention may also be used for fireplace viewing windows, for example. In particular coated glass ceramic substrates have proven to be advantageous for this purpose.

Furthermore, the invention relates to a method for producing a glass or glass ceramic substrate comprising a surface area with a glass matrix and IR-reflecting pigments, in particular for producing a glass or glass ceramic substrate as claimed in any of claims 15 to 33, comprising at least the following steps:

(a) providing a glass or glass ceramic substrate;
(b) providing a paste comprising a glass powder having a softening point $T_{SP,glass\_powder}$, at least one IR-reflecting pigment, and a screen printing medium;
(c) applying the paste as provided in step (b) to the glass or glass ceramic substrate as provided in step (a) in a laterally patterned manner by screen printing;
(d) firing the layer applied in step (c) at temperatures in the range of $T_{firing} \geq T_{SP,glass\_powder}$.

It has been found that further processing steps may be combined with the firing in step (d). According to a preferred variant of the method it is contemplated, for example, that a glass substrate is provided in step (a), preferably a soda-lime glass or a borosilicate glass, and that the glass substrate is thermally toughened in step (d) concomitantly with the firing of the layer applied in step (c). This is made possible by the high temperature resistance of the employed pigments. The firing and thermal toughening in step (d) is preferably effected at a temperature in a range from 500 to 1000° C.

In a further preferred variant of the method, a crystallizable green glass is provided as a substrate in step (a). In this case, the substrate can be ceramized concomitantly with the firing of the layer in step (d). Both variants described above are advantageous in terms of energy and time savings.

In another variant, the method which can be used for coating a glass or glass ceramic substrate, comprises the preparation of a suspension or paste that includes a blowing agent. According to this variant, the coating obtained in this way is designed so as to include pores, so that a coating is provided which is designed as a barrier against the passage of fluids.

This method comprises the steps of:
(a) Preparing a suspension or paste. The suspension comprises a glass powder and an agent that decomposes upon temperature increase to form a volatile substance.

It has been found that particularly advantageous results are achieved with blowing agents which comprise carbonates and/or phosphates, in particular for layer thicknesses of the coating between 0.1 µm and 500 µm.

By way of example, the glass powder is selected from the following composition range, in wt %:

| | | |
|---|---|---|
| $SiO_2$ | 30-75, | preferably 44-75 |
| $Al_2O_3$ | 0-25, | preferably 0.2-25, more preferably 2-25 |
| $B_2O_3$ | 0-30, | preferably 1-30, more preferably 5-30 |
| $Li_2O$ | 0-12 | |
| $Na_2O$ | 0-25, | preferably 0-15 |
| CaO | 0-12 | |
| MgO | 0-9 | |
| BaO | 0-27 | |
| SrO | 0-4 | |
| ZnO | 0-35, | preferably 0-20 |
| $Bi_2O_3$ | 0-5 | |
| $TiO_2$ | 0-10, | preferably 0-5 |
| $ZrO_2$ | 0-7 | |
| $As_2O_3$ | 0-1 | |
| $Sb_2O_3$ | 0-1.5 | |
| F | 0-3 | |
| Cl | 0-1, | preferably 0 |
| $H_2O$ | 0-3. | |

The glass advantageously comprises a minimum $Al_2O_3$ content of 1 wt %, preferably at least 2 wt %. According to a further advantageous embodiment, the glass comprises at least 1 wt % of $B_3O_3$, preferably at least 5 wt %. According to yet another advantageous embodiment, the glass comprises at least 1 wt % of an alkali oxide selected from the group consisting of $Na_2O$, $Li_2O$, and $K_2O$, or mixtures of these oxides.

According to yet another advantageous embodiment, the glass comprises at least 1 wt % of a further oxide or mixture of oxides selected from the group consisting of CaO, MgO, BaO, SrO, ZnO, $ZrO_2$, and $TiO_2$.

According to a further embodiment, the glass is selected from the following composition range, in wt %:

| | | |
|---|---|---|
| $SiO_2$ | 6-65, | preferably 10-65, more preferably 15-65 |
| $Al_2O_3$ | 0-20 | |
| $B_2O_3$ | 0-40, | preferably 1-30, more preferably 3-30 |
| $Li_2O$ | 0-12 | |
| $Na_2O$ | 0-18 | |
| $K_2O$ | 0-17 | |
| CaO | 0-17 | |
| MgO | 0-12 | |
| BaO | 0-38 | |
| SrO | 0-16 | |
| ZnO | 0-70 | |
| $TiO_2$ | 0-5 | |
| $ZrO_2$ | 0-5 | |
| $Bi_2O_3$ | 0-75, | preferably 0-60, more preferably 5-60, most preferably 10-60 |
| CoO | 0-5 | |
| $Fe_2O_3$ | 0-5 | |
| MnO | 0-10 | |
| $CeO_2$ | 0-3 | |
| F | 0-3 | |
| Cl | 0-1 | |
| $H_2O$ | 0-3. | |

The glass flux may furthermore be selected from the following types of glass: alkali-free glasses, alkali-containing glasses, silicate glasses, borosilicate glasses, zinc silicate glasses, zinc borate glasses, zinc borosilicate glasses, bismuth borosilicate glasses, bismuth borate glasses, bismuth silicate glasses, phosphate glasses, zinc phosphate glasses, aluminosilicate glasses, or lithium aluminosilicate glasses.

As a matter of course it is also possible for the glass powder to comprise mixtures of different glasses.

When preparing the suspension, it is possible to initially only introduce the glass powder into a suspension agent. The suspension agent is a liquid and may comprise water, for example. Preferably, the suspension agent comprises solvents, for example organic solvents. The solvents preferably have a vapor pressure of less than 10 bar, preferably less than 5 bar, and most preferably less than 1 bar. This includes, for example, water, 2-(2-butoxyethoxy)ethanol, (2-methoxymethylethoxy)propanol, 2-butoxy ethanol, n-butanol, diethylene glycol monoethyl ether, tripropylene glycol monomethyl ether, terpineol, and n-butyl acetate, which may be provided alone or in mixtures. It is also possible to use commercially available screen printing oils.

In order to be able to adjust the desired viscosity, appropriate additives are used, which may be inorganic or organic. Organic additives include, for example, hydroxyethyl cellulose, and/or hydroxypropyl cellulose, and/or xanthan, and/or polyvinyl alcohol, and/or polyethylene alcohol, and/or polyethylene glycol, block copolymers, and/or triblock copolymers, and/or tree resins, and/or polyacrylates, and/or polymethacrylates.

After the powder has been introduced into the suspension agent, the mixture is homogenized in a next step, for example in a three-roll chair.

Furthermore, it is possible to introduce, into a further suspension agent, a further powder which comprises the blowing agent, for example, and to homogenize it. The two suspensions can then be mixed together.

It is also possible to first produce a mixture of the different powders, for example comprising a glass powder, a blowing agent, and a pigment, and to homogenize this mixture in a tumbler, for example. Then, a paste may be prepared from this powder as described above.

At a shear rate of 200/s as measured with a cone-plate viscometer, the suspension preferably has a viscosity between 2,000 mPa·s and 20,000 mPa·s, preferably between 2,500 mPa·s and 15,000 mPa·s, most preferably between 3,000 mPa·s and 10,000 mPa·s.

Applying the suspension to a substrate so that at least part of the substrate is covered by the suspension.

The applying of the suspension or paste to the substrate such as, for example, a glass or glass ceramic substrate, in particular a glass or glass ceramic substrate having a low coefficient of thermal expansion, may be done over the entire surface, but it is also possible for the suspension to be applied in the form of particular patterns. For example, decorative patterns or characters or a raster pattern may be applied to the substrate in this way.

Suitable coating techniques include, in principle, all common liquid coating processes. For example, the suspension may be applied by a printing technique, in particular screen printing, pad printing, or ink jet printing. Application in a decal process is also possible. Application by spraying, spin coating, or roll coating is possible as well. In order to ensure optimum processability of the suspension, the suspension may be adapted for the respective application process using various auxiliaries, for example additives, solvents, or thixotropic agents. The necessary additives which are mostly organic will evaporate during firing.

Particularly preferred application techniques include ink jet printing, offset printing, pad printing, wet decal transfer, screen printing, dip coating, roll coating, spray coating, doctor blade coating, flooding, and spin coating.

(b) Preferably fixing the suspension applied in step (b) on the substrate, preferably at a temperature between 0° C. and 300° C.

Thus, after the suspension has been applied to at least part of the substrate such as a glass or glass ceramic substrate in step (b), the suspension is preferably fixed on the substrate. This may be achieved, for example, by a drying step at elevated temperatures such as at a temperature between 0° C. and 300° C. The fixing of the suspension on the substrate is particularly advantageous if, after the suspension has been applied to the substrate, the latter has to be transferred to another processing unit, for example in order to perform further processing steps. Depending on the exact composition of the suspension, a favorable temperature range has been found to be between 0° C. and 100° C. and between 100° C. and 300° C. During the fixing, the blowing agent may partially decompose, which however does not adversely affect further foaming at the firing temperature.

In addition to the purely thermal fixing of the suspension on the substrate, it is also possible to promote the fixing by IR radiation and/or by UV radiation. Also, in the case of suitable adjustment of the suspension, the fixing may be achieved solely by IR radiation and/or UV radiation.

(c) Annealing the at least partially coated substrate at a temperature between 500° C. and 900° C., so that the blowing agent decomposes to form at least one volatile substance and causes formation of closed pores in the coating.

The annealing is preferably performed at a temperature between 500° C. and 900° C.

On the one hand, the blowing agent decomposes during the annealing process, and at the same time firing of the coating on the substrate is achieved. As a result, a coating is formed which includes closed pores and which exhibits a good adhesive bond to the substrate.

(d) Cooling the substrate to room temperature.

According to an advantageous embodiment, the coating is applied to the substrate such as, for example, a glass or glass ceramic substrate, in a laterally patterned form of a predetermined pattern.

It may furthermore be advantageous to apply a non-adhering cover sheet to the layer after the suspension has been applied, and to keep the cover sheet on the layer during the annealing. In this way, the layer retains a uniform thickness. The arising of unfavorable layer unevenness or corrugations is avoided. A cover sheet is referred to as "non-adhering" in particular if the cover sheet can be removed from the coating substantially without residue after the annealing.

The suspension is advantageously applied by a printing technique, for example by ink-jet printing, offset printing, pad printing, or screen printing, or by rolling, flooding, dipping, spraying, doctor blading, or spin coating.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will now be described in more detail by way of exemplary embodiments and with reference to the figures, wherein.

DETAILED DESCRIPTION

Figure 1:
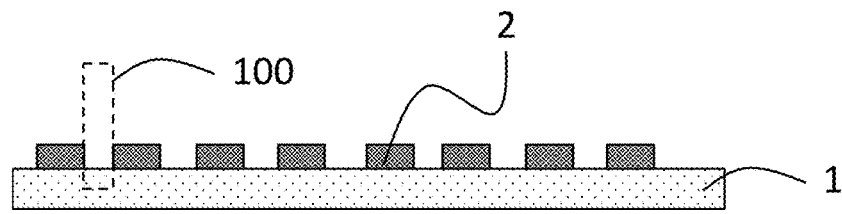
FIG. 1 is a schematic view showing an exemplary embodiment of a substrate coated according to the invention.

FIG. 1 is a schematic side view showing an embodiment of a substrate coated according to the invention. In the illustrated exemplary embodiment, the coating 2 has been applied to one of the surfaces of substrate 1, while the other surface 110 of substrate 1 is not coated. Coating 2 is applied to the surface area of the substrate 1 shown in FIG. 1 in a laterally patterned manner, so that the substrate 1 has non-coated areas 120 on the coated surface 100 as well. Coating 2 may be applied in the form of a raster pattern or in the form of a dot pattern, for example. Degree of coverage of the substrate refers to the ratio of the coated surface to the entire surface 100.

Figure 2:
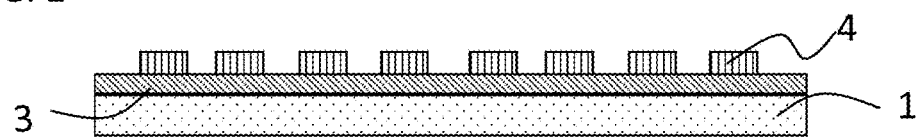
FIG. 2 is a schematic view showing a comparative example of a coated substrate.

FIG. 2 shows a schematic view of a comparative example. Here, the entire surface of substrate 1 is provided with a coating 3 which includes conductive oxides, such as indium tin oxide. Thus, coating 3 is the IR-reflecting layer in the comparative example. Furthermore, a pigmented decorative layer 4 is applied on top of layer 3. However, in contrast to the exemplary embodiment shown in FIG. 1, layer 4 is merely a decorative layer.

The making of the coated substrate as shown in FIG. 1 will now be explained in more detail below by way of an exemplary embodiment.

For producing the coated substrate shown in FIG. 1, first a paste is provided comprising an IR-reflecting pigment, a glass powder, and a pasting medium. Table 1 lists several IR-reflecting pigments that have proven to be particularly advantageous. Pigment #5 is a comparative pigment.

TABLE 1

IR-reflecting pigments and comparative example 5

| | Color Code Pigment | Composition | Density | BET (m²/g) | Mean size (d50) (μm) | TSR (%) |
|---|---|---|---|---|---|---|
| 1 | CI Brown 29 - 1 | chromium iron oxide | 5.2 | 1.9 | 1.1-1.6 | 25 |
| 2 | CI Brown 29 - 2 | chromium iron oxide | 5.4 | 2.9 | 0.97-1.2 | 27 |
| 3 | CI Green 17 | chromium green-black hematite | 5.2 | 2.7 | 1.1-1.4 | 25 |
| 4 | CI Brown 29 - 3 | chromium iron oxide | 5.1 | 3 | 1.11-1.3 | 29 |
| 5 | CI Black 30 | chromium iron nickel black spinel | 5.3 | 3 | 1.1 | 13 |

For producing the glass powder or glass frit, the individual glass constituents are mixed, melted, and the molten glass is quenched, and a glass powder with the desired particle size and particle size distribution is obtained by grinding processes. The glass powder (layer-forming glass component) may have very different compositions. Numerous glass compositions are known, which cover a range of softening points from approximately 500° C. to 1000° C., adapted to the deformation temperature of the substrate to be coated.

Table 2 shows some glass compositions or glass powders that have been found to be particularly advantageous.

TABLE 2

Properties of the glass powders of different exemplary embodiments

| Composition | wt % | Glass No. | | | | | | | | | |
| | | 1 | 2 | 3 | 4 | 5 | 6 | 7 | 8 | 9 | 10 |
|---|---|---|---|---|---|---|---|---|---|---|---|
| $Li_2O$ | | 0.1 | 0.2 | 3.1 | 0.8 | 4.4 | 1.3 | 4 | | 3.1 | 4.4 |
| $Na_2O$ | | 3.3 | 10.1 | | 2.4 | 0.2 | | 10 | 18.8 | | 0.2 |
| $K_2O$ | | 0.6 | 1.5 | | 1.7 | | 0.5 | | 0 | | |

TABLE 2-continued

Properties of the glass powders of different exemplary embodiments

| Composition | wt % | Glass No. | | | | | | | | | |
|---|---|---|---|---|---|---|---|---|---|---|---|
| | | 1 | 2 | 3 | 4 | 5 | 6 | 7 | 8 | 9 | 10 |
| MgO | | | | 1.7 | | | 0.1 | 1 | | 1.7 | |
| CaO | | | 0.0 | 2.0 | 0.5 | | 0.2 | 3 | 0.9 | 2 | |
| SrO | | | | | | | | | | 2.3 | |
| BaO | | | | | 1.1 | | | | | | |
| ZnO | | 9.6 | 28.0 | 3.4 | | 22.8 | 0.1 | 8 | 8.5 | 2.2 | |
| $B_2O_3$ | | 4.9 | 15.8 | 16.7 | 21.9 | 22.8 | 7.2 | 18 | 13.1 | 16.7 | 23.1 |
| $Al_2O_3$ | | 0.2 | 1.6 | 16.6 | 5.1 | 7.2 | 3.3 | 5 | 1 | 16.6 | 5.9 |
| $SiO_2$ | | 27.0 | 36.0 | 54.4 | 63.4 | 56.0 | 21.2 | 50 | 50.9 | 54.3 | 57 |
| $P_2O_5$ | | | 0.0 | | | | | | | | |
| $TiO_2$ | | 2.2 | 5.2 | | | | 0.1 | 1 | 6.3 | | |
| $ZrO_2$ | | | 0.8 | 1.3 | | | 2 | | 0.5 | 1.1 | |
| $SnO_2$ | | | | | | | | | | | |
| $Bi_2O_3$ | | 52.0 | 0.1 | | | 10.0 | 64 | | | | 9.4 |
| F | | 0.2 | 0.9 | | 2.2 | | | | | | |
| Cl | | | | 0.8 | 0.5 | | | | | | |
| Total | | 100 | 100 | 100 | 100 | 100.60 | 100 | 100 | 100 | 100.00 | 100 |
| Properties glassy | | | | | | | | | | | |
| Transition temperature Tg | ° C. | | ~480 | 550 | 430 | 474 | 445 | 490 | 536 | 578 | 478 |
| Softening point SP ($10^{7.6}$ dPa · s) | ° C. | | ~560 | 750 | 715 | 660 | 548 | 594 | 644 | 755 | 698 |
| Thermal expansion $\alpha_{20/300}$ | $10^{-6}$/K | | ~12 | 4.40 | 4.1 | 4.8 | 7.3 | 8.6 | 9.7 | 4.4 | 4.8 |
| Density | g/cm$^3$ | | ~2.9 | 2.40 | 2.21 | 2.41 | 4.52 | 2.48 | 2.69 | 2.41 | 2.43 |

The glass powders listed in Table 2 have proven to be particularly advantageous with regard to processability during the process of making the coated substrate and also with regard to the optical, mechanical, and chemical properties of the corresponding coating.

What is relevant, for example, in order to ensure good processability is the softening point ($T_{SP\_glass\_powder}$) of the glass, since for flowing so as to smooth out, i.e. for producing the coating from the applied paste, the firing temperature has to equal at least the softening point SP of the glass powder. The softening point SP is the temperature at which the glass has a viscosity of $10^{7.6}$ dPa·s. Depending on the geometry of the glass sheet and the heating process, deformations of glass substrates, for example, have been observed already clearly below their SP. The flowing of the glass component so as to smooth out into a layer is necessary to ensure the required chemical, physical, mechanical, and optical properties. Flowing so as to smooth out is also necessary for fixing the added pigments and other fillers or additives.

Furthermore, properties such as chemical resistance to acids and bases or to hydrolytic attacks as well as cleanability and scratch resistance are important selection criteria. The glasses listed in Table 2 meet these requirements in a particularly advantageous manner.

Coatings 1 to 8 listed in Table 3 were obtained from the pigments and glass powders listed in Tables 1 and 2. Example 9 is a comparative example.

TABLE 3

Table 3: Exemplary embodiments 1 to 8 and comparative example

| Substrate | Unit | Example | | | | |
|---|---|---|---|---|---|---|
| | | 1 transparent floated soda-lime glass | 2 transparent floated soda-lime glass | 3 transparent floated soda-lime glass | 4 transparent floated soda-lime glass | 5 transparent floated soda-lime glass |
| LAYER COMPOSITION | | | | | | |
| Glass (glass # from table 1) | | 1 (80 vol %) | 2 (80 vol %) | 1 (90.5 vol %) | 2 (80 vol %) | 1 (80 vol %) |
| Pigment (pigment # from table 2) | | 1 (20 vol %) | 1 (20 vol %) | 2 (9.5 vol %) | 2 (20 vol %) | 3 (20 vol %) |
| Coating | | screen printing | screen printing | screen printing | screen printing | screen printing |
| Medium Pasting ratio (powder:organics) | weight | 10:3.7 | 10:2.5 | 10:3.7 | 10:2.5 | 10:3.7 |
| Screen mesh | | 77 | 77 | 77 | 77 | 77 |
| Firing | | laboratory oven | laboratory oven | laboratory oven | laboratory oven | laboratory oven |
| Firing conditions temperature/time | ° C./min | 680/15 | 680/15 | 680/15 | 680/15 | 680/15 |

TABLE 3-continued

Table 3: Exemplary embodiments 1 to 8 and comparative example

PROPERTIES OF COATED SUBSTRATE - SINGLE PRINT

| | | | | | | |
|---|---|---|---|---|---|---|
| Sclerometer test 10N | | ok | ok | ok | ok | ok |
| Tightness against ingress of fluids | | ok | ok | ok | ok | ok |
| Layer thickness [±1 μm] | | 11.7 | 11.3 | 13.0 | 13.7 | 15.3 |
| Optical thickness | | 2.8 | 4.5 | 3.0 | 4.8 | 3.0 |
| Gloss (60°) | | 58 | 16 | 46 | 10 | 76 |
| $L^*a^*b^*$ (SCE; on color side; black background) | | 11.41/ 2.99/0.38 | 28.07/ 0.66/−1.6 | 12.99/ 2.17/−0.15 | 28.3/ 0.47/−1.38 | 9.52/ 2.04/0.6 |
| Temperature measured after heating with IR lamp for 10 min | °C. | 101.4 | 107.5 | 107.5 | 106.7 | 103.8 |

PROPERTIES OF COATED SUBSTRATE - DOUBLE PRINT

| | | | | | | |
|---|---|---|---|---|---|---|
| Sclerometer test 10N | | ok | ok | ok | ok | ok |
| Tightness against ingress of fluids | | ok | ok | ok | ok | ok |
| Layer thickness [±1 μm] | | 28.0 | 25.0 | 25.7 | 24.7 | 27.7 |
| Optical thickness | | 5.4 | 4.9 | 5.7 | 4.85 | 6.01 |
| Gloss | | 43 | 13 | 34 | 10 | 58 |
| $L^*a^*b^*$ | | 13.68/ 2.41/0.24 | 28.38/ 0.56/−1.87 | 15.17/ 1.66/−0.54 | 28.43/ 0.44/−1.59 | 11.93/ 1.59/−0.31 |
| Temperature measured after heating with IR lamp for 10 min | °C. | 101 | 108 | 110 | 106.5 | 104.6 |

| | | Example | | | |
|---|---|---|---|---|---|
| Substrate | Unit | 6 transparent floated soda-lime glass | 7 transparent floated soda-lime glass | 8 transparent floated soda-lime glass | 9 transparent floated soda-lime glass |

LAYER COMPOSITION

| | | | | | |
|---|---|---|---|---|---|
| Glass (glass # from table 1) | | 2 (80 vol %) | 1 (80 vol %) | 2 (80 vol %) | 1 (80 vol %) |
| Pigment (pigment # from table 2) | | 3 (20 vol %) | 4 (20 vol %) | 4 (20 vol %) | 5 (20 vol %) |
| Coating | | screen printing | screen printing | screen printing | screen printing |
| Medium Pasting ratio (powder:organics) | weight | 10:2.5 | 10:3.7 | 10:2.5 | 10:3.1 |
| Screen mesh | | 77 | 77 | 77 | 43 |
| Firing | | laboratory oven | laboratory oven | laboratory oven | laboratory oven |
| Firing conditions temperature/time | °C./min | 680/15 | 680/15 | 680/15 | 680/15 |

PROPERTIES OF COATED SUBSTRATE - SINGLE PRINT

| | | | | | |
|---|---|---|---|---|---|
| Sclerometer test 10N | | ok | ok | ok | ok |
| Tightness against ingress of fluids | | ok | ok | ok | ok |
| Layer thickness [±1 μm] | | | 14.0 | 13.3 | |
| Optical thickness | | 4.7 | 2.9 | 2.5 | |
| Gloss (60°) | | 15 | 84 | 82 | |
| $L^*a^*b^*$ (SCE; on color side; black background) | | 29.4/ 0.28/−1.51 | 10.01/ 1.87/−0.38 | 14.69/ 0.66/−2.41 | |
| Temperature measured after heating with IR lamp for 10 min | °C. | 108.7 | 98.9 | 101.8 | |

PROPERTIES OF COATED SUBSTRATE - DOUBLE PRINT

| | | | | | |
|---|---|---|---|---|---|
| Sclerometer test 10N | | ok | ok | ok | ok |
| Tightness against ingress of fluids | | ok | ok | ok | ok |
| Layer thickness [±1 μm] | | 30.0 | 30.0 | 26.3 | |
| Optical thickness | | 4.6 | 2.9 | 2.5 | |
| Gloss | | 4 | 65 | 58 | |
| $L^*a^*b^*$ | | 31.19/ 0.36/−1.21 | 11.99/ 1.52/−0.86 | 20.23/ 0.33/−2.78 | |

TABLE 3-continued

Table 3: Exemplary embodiments 1 to 8 and comparative example

| Temperature measured after heating with IR lamp for 10 min | ° C. | 108.8 | 97.1 | 96.7 | 119 |

Figure 3:
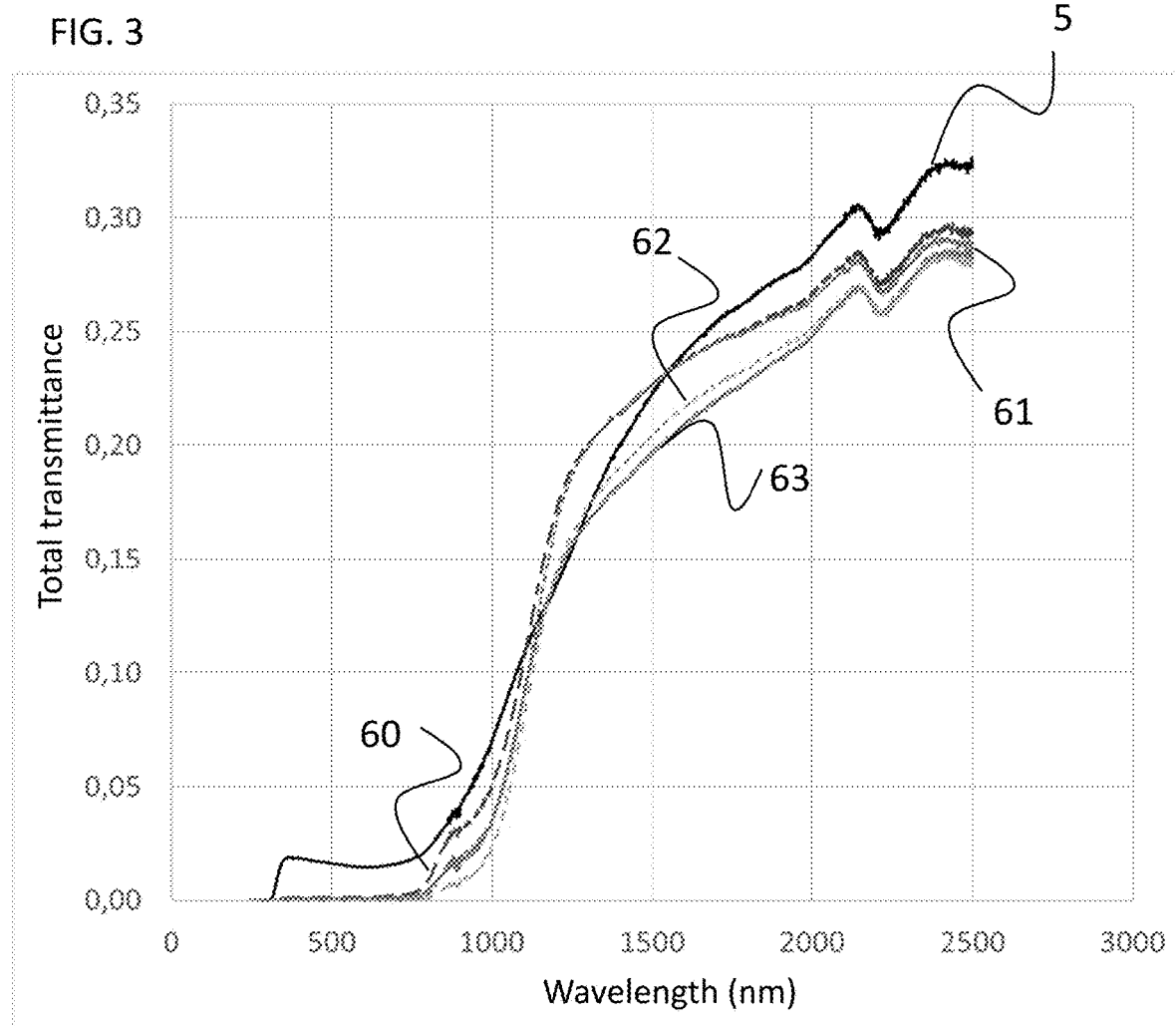
FIG. 3 shows a graph of total transmittance spectra (measured according to ASTM D 1003) of several exemplary embodiments and one comparative example.

FIG. 3 shows the transmittance profile of exemplary embodiments 1 to 4 and of one comparative example. Here, transmittance is the total transmittance as measured according to the ASTM D1003 standard. Curve 60 corresponds to exemplary embodiment 1, curve 61 to exemplary embodiment 2, curve 62 to exemplary embodiment 3, and curve 63 to exemplary embodiment 4. The coatings were applied by screen printing in a printing process using a screen with a mesh size of 77 threads per cm in a layer thickness ranging from 11 to 15 µm.

Curve 5 represents the transmittance of comparative sample 9 and was applied using a screen with a mesh size of 43 threads per cm. Here, layer thickness was greater than that of the exemplary embodiments.

It is apparent here that the exemplary embodiments exhibit a transmittance which is below the transmittance of the comparative example, in particular in the longer wavelengths range of 1500 nm and above. It has to be taken into account here that the layer thickness of the comparison sample was greater than the layer thickness of the exemplary embodiments. Therefore, it can be assumed that the difference in the transmittance values between the exemplary embodiments and the comparative example would be even more pronounced for layers of the same thickness. Furthermore, curves 60 to 63 reveal that the IR-reflecting pigment which is employed has a greater impact on transmittance than the glass composition of the glass matrix. The layers of transmittance profiles 60 and 61 differ in their glass composition, but they include the same pigment. The same applies to the layers of curves 62 and 63. Samples 60 and 62, on the other hand, have the same glass composition, but differ in the pigment that was used.

Figure 4:
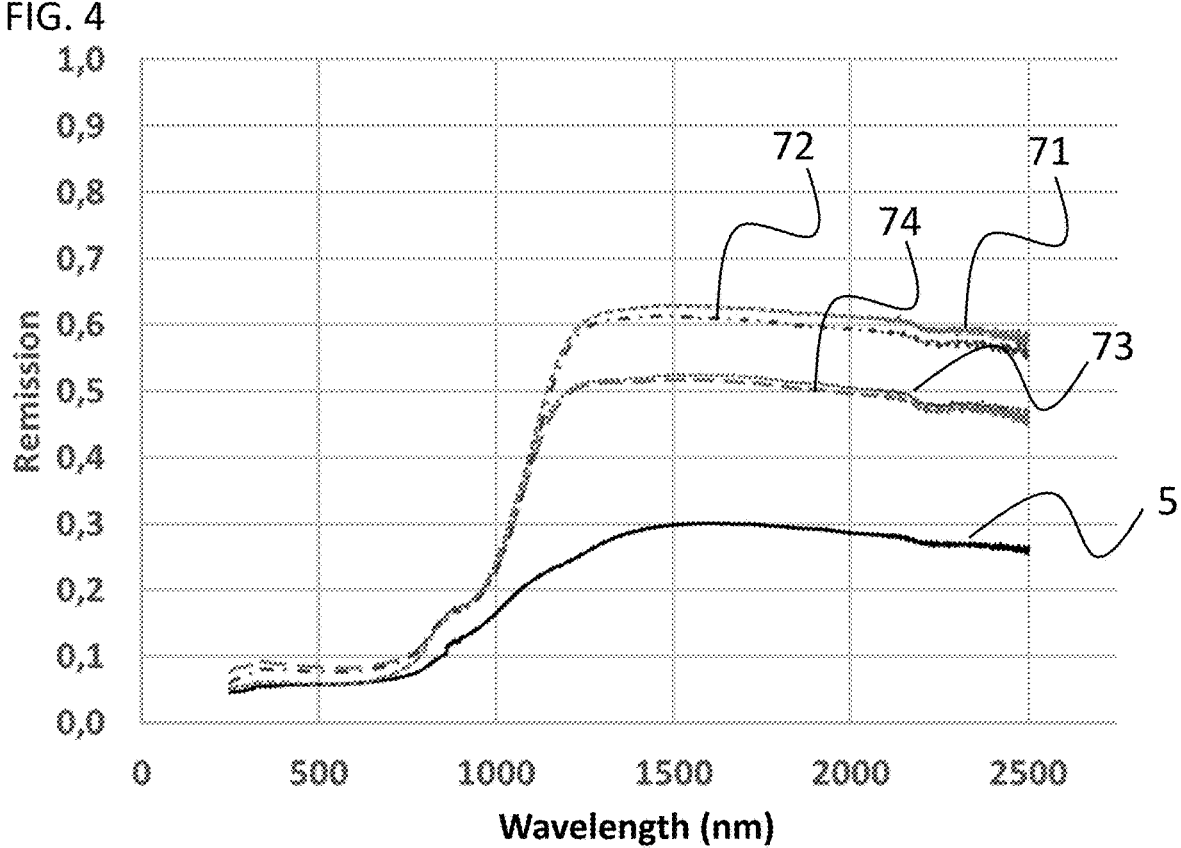
FIG. 4 shows a graph of remission spectra (measured according to ISO 13468) of several exemplary embodiments and one comparative example.

FIG. 4 shows the remission versus wavelength profiles of samples 7 and 8 and of comparative example 9 from table 3. The remission profiles shown in FIG. 4 corresponds to total remission measured in compliance with the ISO 13468 measurement standard. Samples 7 and 8 differ in their glass composition, but include the same IR-reflecting pigment. Curves 71 and 73 represent exemplary embodiment 7 from Table 3, the individual layers differing in terms of layer thickness. Curve 71 corresponds to the remission profile of exemplary embodiment 7, the coating was applied by two printing processes using a screen with a mesh size of 77 threads per cm, and the layer has a thickness of 24 to 28 µm. The layer of curve 73 was applied by a single printing process and has a thickness of 11 to 15 µm. The same applies to the relationship between curves 72 and 74 which represent embodiment 8 from Table 3. The layer corresponding to the remission profile represented by curve 72 has a thickness of 24 to 28 µm, and the layer corresponding to the remission profile represented by curve 74 has a thickness of 11 to 15 µm. With these layer thicknesses, stresses relax even in the case of larger differences in thermal expansion without causing chipping or strength issues.

What becomes clear from FIG. 4 is that the layers according to the invention exhibit a remission in the IR range, which is significantly higher than the remission of the comparative example, in particular in the range of 1500 nm and above which is relevant for remission of heat radiation at temperatures in the range from 200 to 475° C. Furthermore, it becomes clear that the glass composition also has an impact on remission in the IR range, this impact increasing with increasing layer thickness of the coating.

Figure 5:
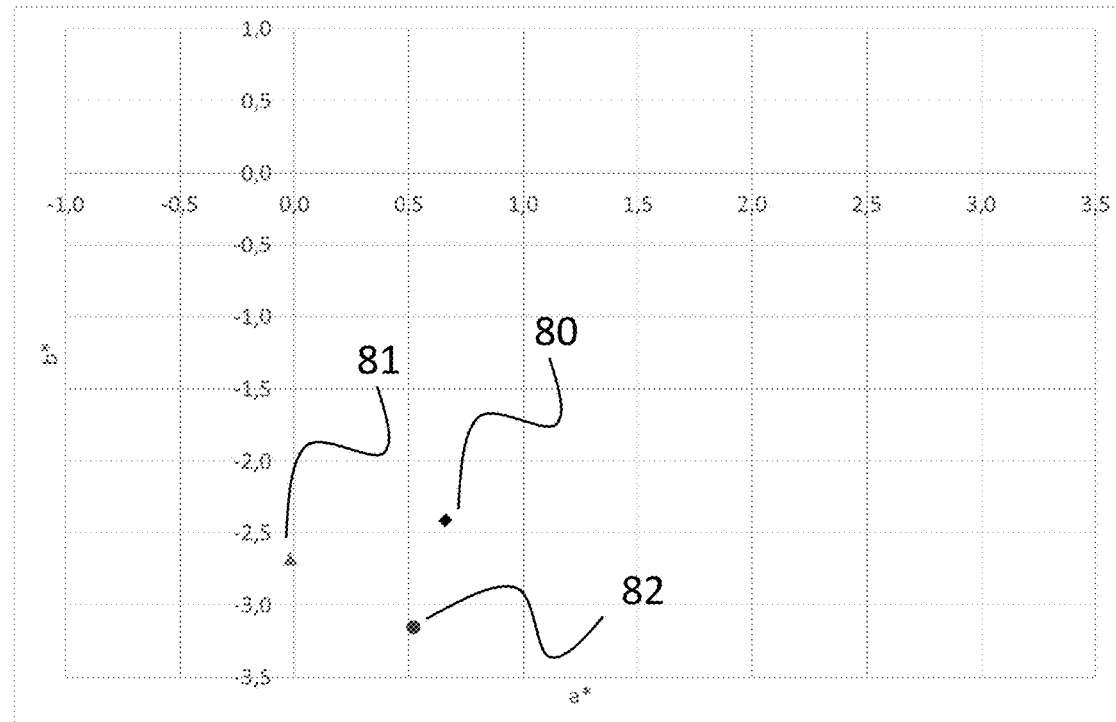
FIG. 5 shows a graph illustrating the shift in color coordinates of the coating depending on the coating composition.

FIG. 5 shows the influence of different pigments in the coating on the color coordinates of the coating as determined in compliance with measurement standard EN ISO 11664-4 using a D65 light source and measured on the colored side. Reference numeral 80 indicates the color coordinates of a coating according to exemplary embodiment 8 from the table. The coating was applied to the substrate by a simple printing process using a screen with a mesh size of 77 threads per cm with a nominal thread diameter of 55 µm and has a layer thickness of 11 to 15 µm. The color coordinates of sample 80 are shifted into the yellow color space. Compared to this, samples 81 and 82 show a slight yellow shift, in particular sample 81 shows a strong offset from sample 80 towards the neutral range. This shift in color coordinates is caused by adding a second IR-reflecting pigment. Table 4 shows the pigment compositions of coatings 80 to 82.

TABLE 4

Pigment composition of the layers shown in FIG. 5

| Sample | First IR-reflecting pigment | Percentage of first IR pigment in the coating | Second IR pigment | Percentage of second IR pigment in the coating |
| --- | --- | --- | --- | --- |
| 80 | CI Brown 29-3 (chromium iron oxide) | 20 vol % | — | — |
| 81 | CI Brown 29-3 (chromium iron oxide) | 15 vol % | CI Pigment Blue 86 (cobalt chromite blue-green spinel) | 5 vol % |
| 82 | CI Brown 29-3 (chromium iron oxide) | 15 vol% | CI Pigment Blue 36 (indium manganese yttrium oxide) | 5 vol % |

Figure 6:
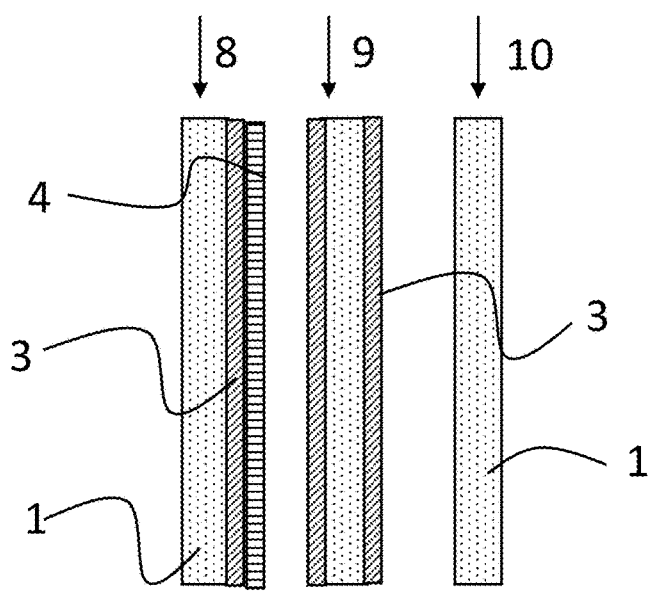
FIGS. 6 to 8 are schematic views illustrating the configuration of an oven door according to one embodiment of the invention and of comparative examples known from the prior art.

FIG. 6 is a schematic view illustrating the arrangement of the glass sheets in a cooking oven door as known from the prior art. Here, the oven door comprises three thermally toughened glass sheets 8, 9, and 10, with glass sheet 8 being the outer sheet and 10 being the inner glass sheet. Thus, glass sheet 10 faces the interior of the oven and glass sheet 8 delimits the oven door to the outside.

Sheets 8 and 9 have additional coatings 3, 4 on one or two of the surfaces of the glass substrate 1. In the present case, the outer sheet 8 has a two-layer coating on the side facing the interior of the oven, including a coating 3 comprising a transparent conductive oxide, and a decorative layer 4 deposited thereon. Decorative layer 4 is an enamel layer and contains a black or brown pigment in a glass matrix. Layer 4 functions as a purely decorative layer, backscattering of the heat radiation emanating from the oven's interior is only or almost exclusively caused by the oxide layer 3. The intermediate sheet 9 has an oxide layer 3 on both sides thereof, for increasing the backscattering of heat radiation into the oven's interior.

Figure 7:
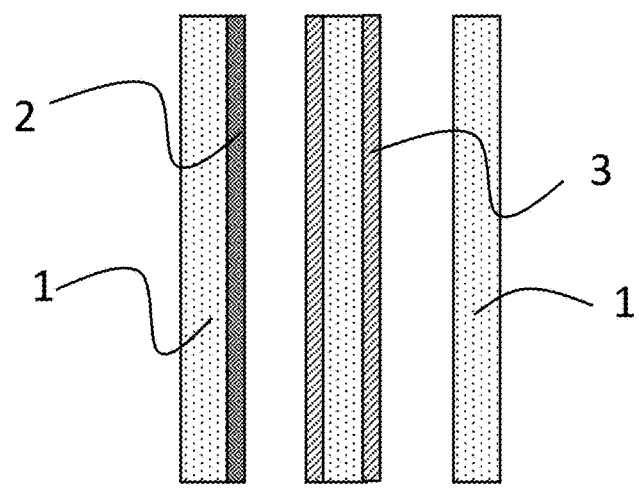
Figure 8:
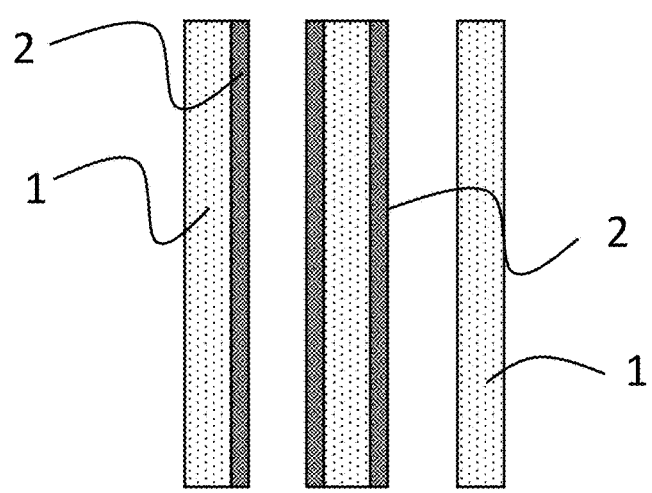

FIGS. 7 and 8 are schematic views illustrating the glass sheet assemblies of ovens according to two exemplary embodiments of the invention. The glass substrate 1 without coating preferably exhibits a light transmittance Y of more than 5%, preferably more than 20%, and most preferably more than 80%, as measured using standard illuminant C/2°. Light transmittance Y is measured in the CIE color system. This value is valid regardless of the thickness of the substrate, which can usually be between 2 and 10 mm. The substrate material may be transparent, transparently stained by coloring oxides, or may have a translucent appearance caused by light scattering. In glass ceramic substrates or ceramic substrates, such light scattering may be caused by the presence of scattering crystals in the substrate material, for example.

In a preferred embodiment, the substrate material consists of a silicate glass ($SiO_2$ content >40 wt %). Advantageously, a float glass sheet made of commercially available soda-lime glass is used as the substrate, here. Such soda-lime glass sheets are available in different qualities, depending on the iron content. Most preferably, the soda-lime glass sheet is thermally toughened. In a further preferred embodiment, the float glass sheet is made of borosilicate glass, such as, for example, float glass types BOROFLOAT® 3.3, or BOROFLOAT® 4.0 from SCHOTT AG.

The exemplary embodiment shown in FIG. 7 differs from the configuration shown in FIG. 6 in that the coating of the outer glass sheet 8 comprises only one layer 2. Layer 2 contains an IR-reflecting pigment with a TSR value of at least 20% and a remission of at least 35% at a wavelength of 1500 nm. Here, layer 2 not only functions as a decorative layer, but also provides for efficient backscattering of the heat radiation into the interior of the oven, so that an additional layer 3 with transparent conductive oxides can be dispensed with. FIG. 8 shows a refinement of the invention in which the oxide layers 3 on the intermediate sheet 8 have also been replaced by the layer 2 according to the invention.

Figure 14:
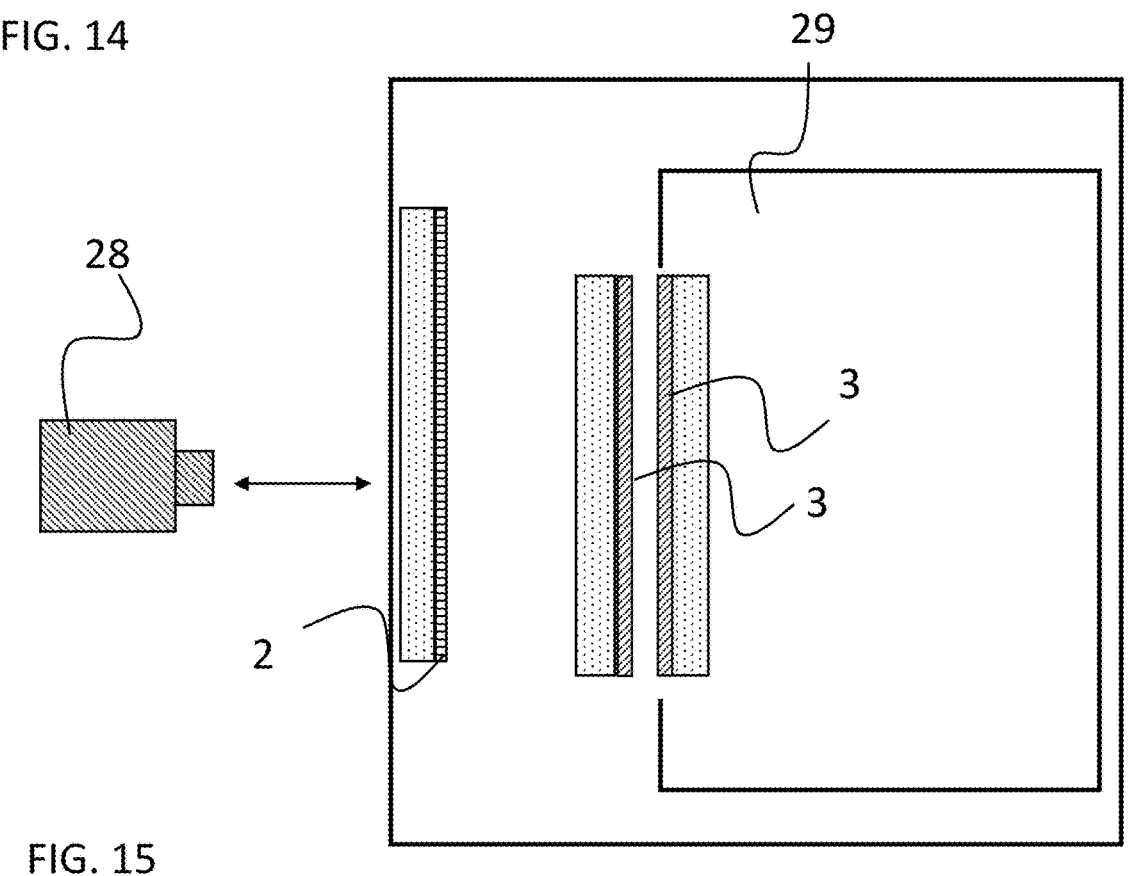
FIG. 14 is a schematic diagram of the measurement setup for determining the surface temperature of the outer oven glass. By setting different temperatures, a pyrolysis process at 468° C. (875° F.) or a cooking process at 246° C. (475° F.) can be simulated.

Measurements have revealed that a substrate coated according to the invention is outstandingly suitable for use as the outer glass sheet of an oven door that comprises a plurality of glass sheets. For this purpose, a substrate coated accordingly was installed in an oven as the outer glass sheet, and the surface temperature was determined on the outer surface of the glass sheet (FIG. 14). The respective surface temperatures of the glass sheets were determined using an IR camera from Fluke, and a corresponding IR thermal image was recorded at intervals of one minute. The distance between the thermal imaging camera and the outer sheet of the oven door was 203.2 cm. The corresponding temperatures were determined from the thermal images obtained in this way. In the test setup, the oven volume was 28.317 l, or 5.3 $ft^3$. The measurements were taken for an oven internal temperature of 875° F. (468° C.), and 475° F. (246° C.) in each case. In addition, comparative measurements were performed, in which a glass substrate with an enamel coating 4 including a conventional black pigment was used as the outer glass sheet.

Figure 15:
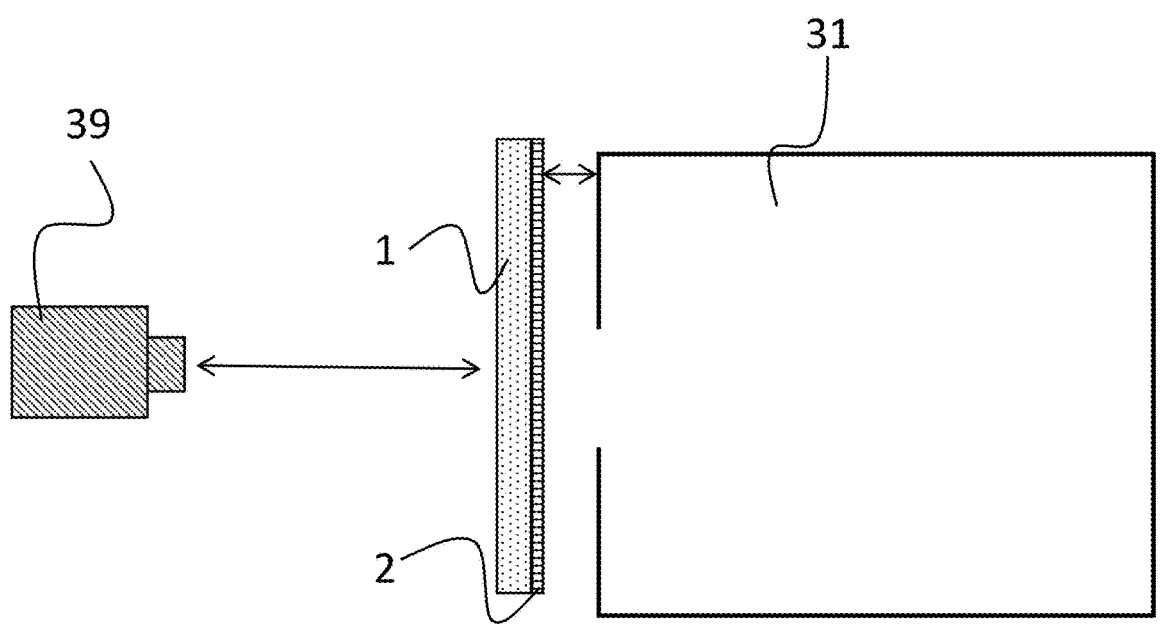
FIG. 15 is a schematic diagram of the measurement setup for determining the surface temperature of the outer oven glass during simulation of a cooking process at 450° C.

FIG. 15 illustrates a laboratory measurement setup. Here, the respective surface temperatures of the glass sheets were determined using a pyrometer 39 (impac, IE 120/82L), the focal point was placed on the outer surface of the decorated glass sheet, and a respective measured value was recorded every minute. The distance of the pyrometer 39 to the outer glass sheet of the oven door was 50 cm. The volume of the oven was 30×12×12 cm in the test setup. The distance from the decorated glass sheet to the oven was 2 cm, the opening of the oven had a diameter of 3 cm. The measured sheets were coated over the entire surface thereof.

Figure 9:
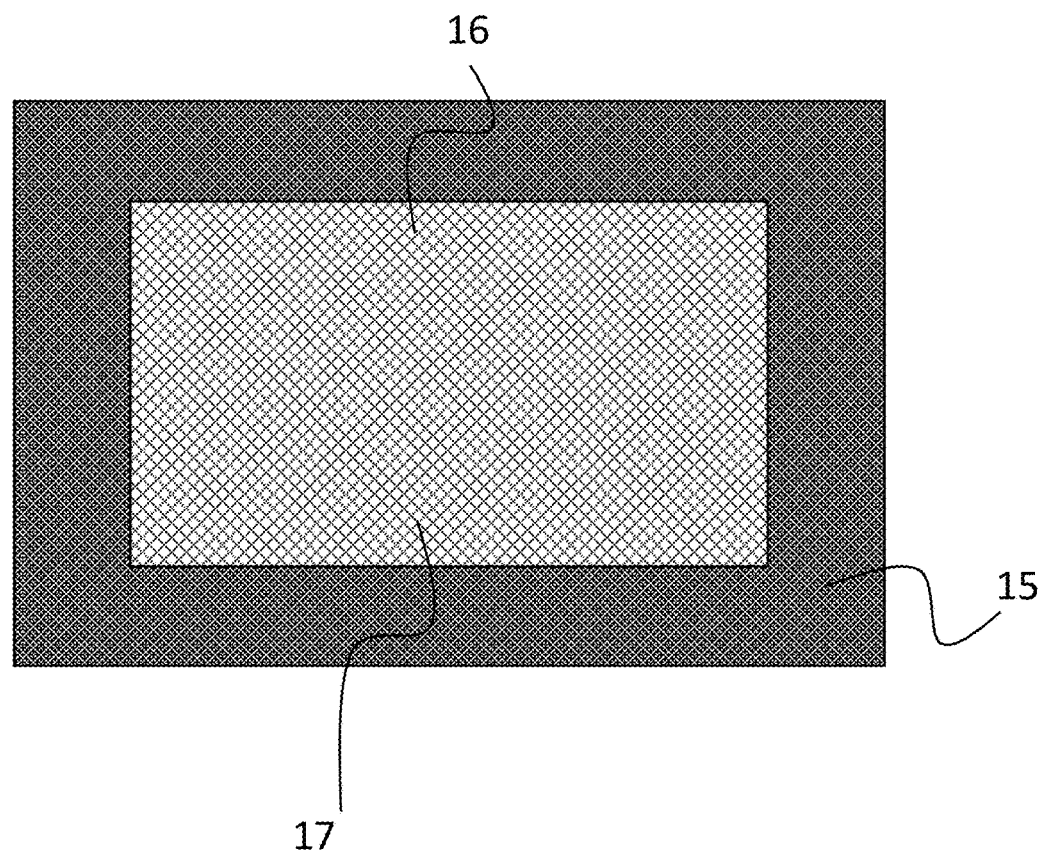
FIG. 9 is a schematic view of the outer sheet of an oven door illustrating different degrees of coverage.

FIG. 9 is a schematic view showing the coverage of the outer sheet of the exemplary embodiment with the respective decorative layer. The outer sheet has dimensions of 29.0 by 20.1 inches. In the peripheral area of the sheet, the respective decorative coating was applied in the form of a full-surface frame 15, the frame 15 leaving a viewing area 16 with dimensions of 20 by 9.75 inches. In this viewing area 16, the decorative layer is applied in the form of a raster pattern 17. In addition, comparative measurements were performed, in which a glass substrate with an enamel coating 4 including a conventional black pigment was used as the outer sheet.

Figure 10:
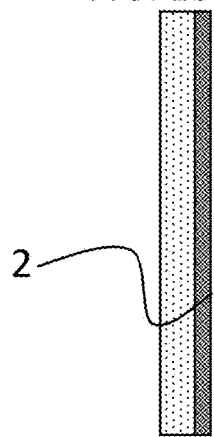
FIGS. 10 and 11 are schematic views of the configuration of different oven doors.
Figure 11:
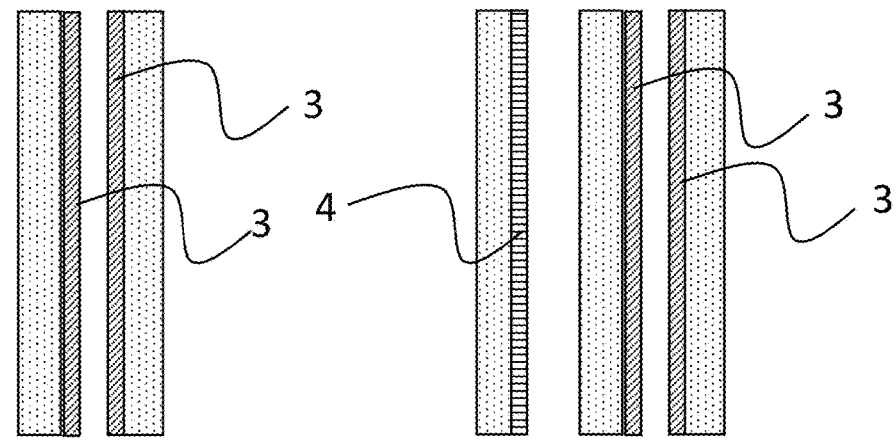

FIGS. 10 and 11 are schematic views showing the respective configuration of the oven door of the exemplary embodiment (FIG. 10) and of the comparative example (11). In both cases, the non-coated side of the substrate faces outwards. In each case, both the intermediate and the inner sheets of the oven door are coated with a coating 3 on one surface thereof. Coating 3 comprises transparent conductive oxides.

Once the respective sheets had been installed, the oven was brought to an operating temperature of 246° C. or 468° C., respectively, and the temperature was determined at several points on the outer surface of the outer glass sheet of the oven.

Figure 12:
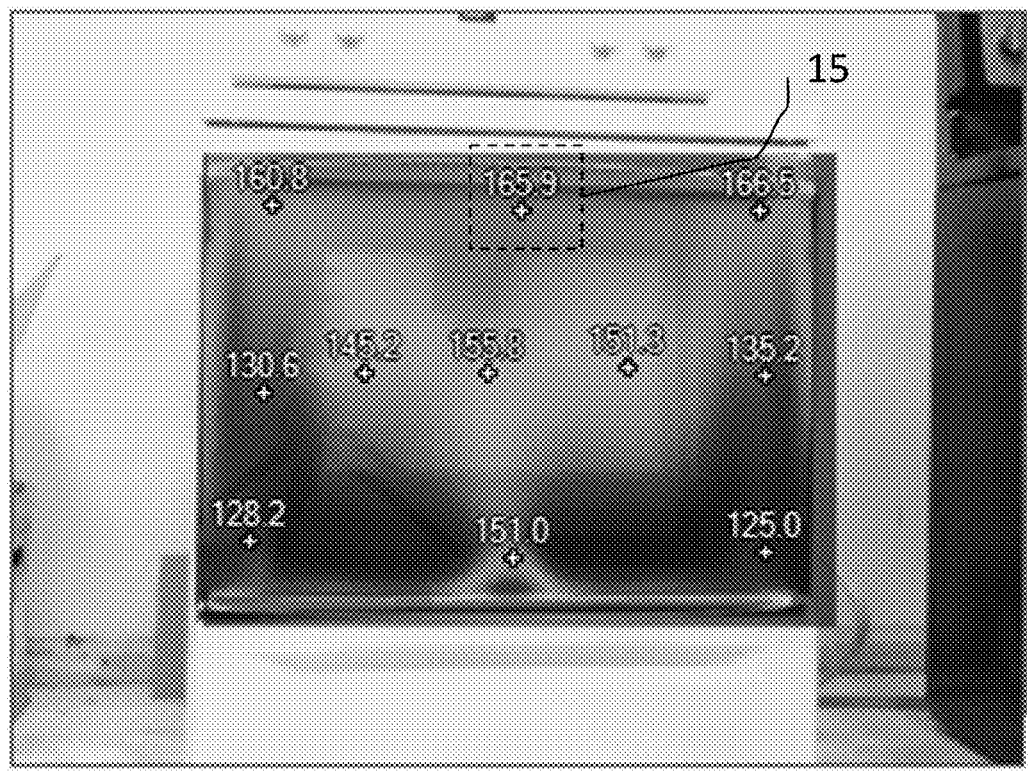
FIGS. 12 and 13 show thermal imaging camera photographs of an oven comprising a glass sheet coated according to the invention as an exemplary embodiment and of an oven comprising a conventionally coated glass sheet as a comparative example.
Figure 13:
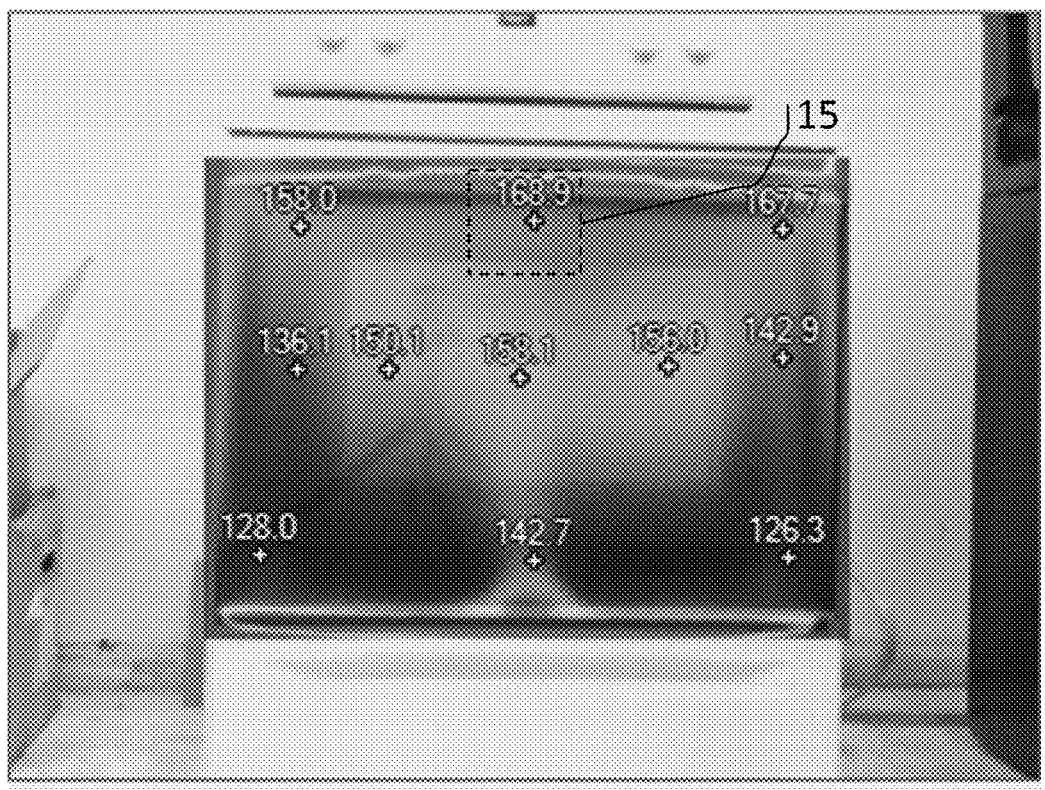

FIG. 12 shows the photograph of a thermal imaging camera of an outer oven door comprising an outer glass sheet according to the invention, after an operating time of 180 minutes while the oven was heated to 468° C. Here, the comparatively high temperatures at the upper edge of the door and in the middle near the lower edge area can be explained by heat loss due to the experimental setup and also arise in the photograph of a thermal imaging camera of the comparative example as shown in FIG. 13.

FIG. 14 schematically shows a variant of a measurement setup for determining the outside temperature of the oven door. Here, a typical household oven with a volume of 28.317l or 5.3 ft is heated to 246° C. (maximum operating temperature in cooking mode) or to 468° C. (maximum operating temperature in pyrolysis mode). In this measurement setup, the oven door comprises three sheets, the inner two glass sheets each having a low-E coating 3. The coatings 3 are deposited on the surfaces of the two inner glass sheets facing one another. In the examined exemplary embodiments, the outer glass sheet had a coating 2 comprising an IR-reflecting pigment, and the coating 2 was applied to the surface of the glass sheet facing the interior of the oven. The respective surface temperatures of the glass sheets were determined using an IR camera 28 from Fluke, and a respective IR thermal image was recorded at intervals of one minute. The distance between the thermal imaging camera and the outer sheet of the oven door was 203.2 cm. The corresponding temperatures were determined from the thermal images obtained in this way. The volume of the oven was 28.317 l, or 5.3 ft³, in the test setup.

FIG. 15 schematically shows a measurement setup for determining the surface temperatures of a coated glass sheet under laboratory conditions. In this case, a laboratory oven 31 is heated to a temperature of 450° C. The oven has an opening with a diameter of 3 cm. The glass sheet 1 with the coating 2 to be measured is placed at a distance of 3 cm from this opening with the coating 2 facing the opening of the oven. The surface temperature of the coated glass sheet 1 is determined using a pyrometer 34 (impac, IE 120/82L). The pyrometer 39 is arranged behind the decorated glass substrate 30 to be measured and at a distance of 50 cm from the glass sheet 1 to be measured.

Figure 16:
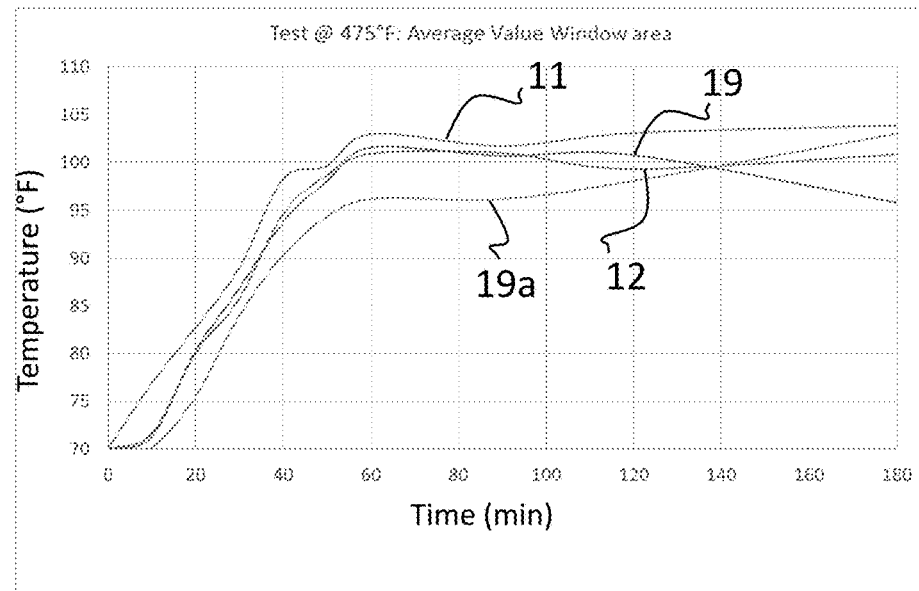
FIG. 16 is a graph of the temperature profile of the temperature of the outer oven glass of various exemplary embodiments and of the comparative example at an operating temperature of the oven of 475° F. (246° C.)
Figure 17:
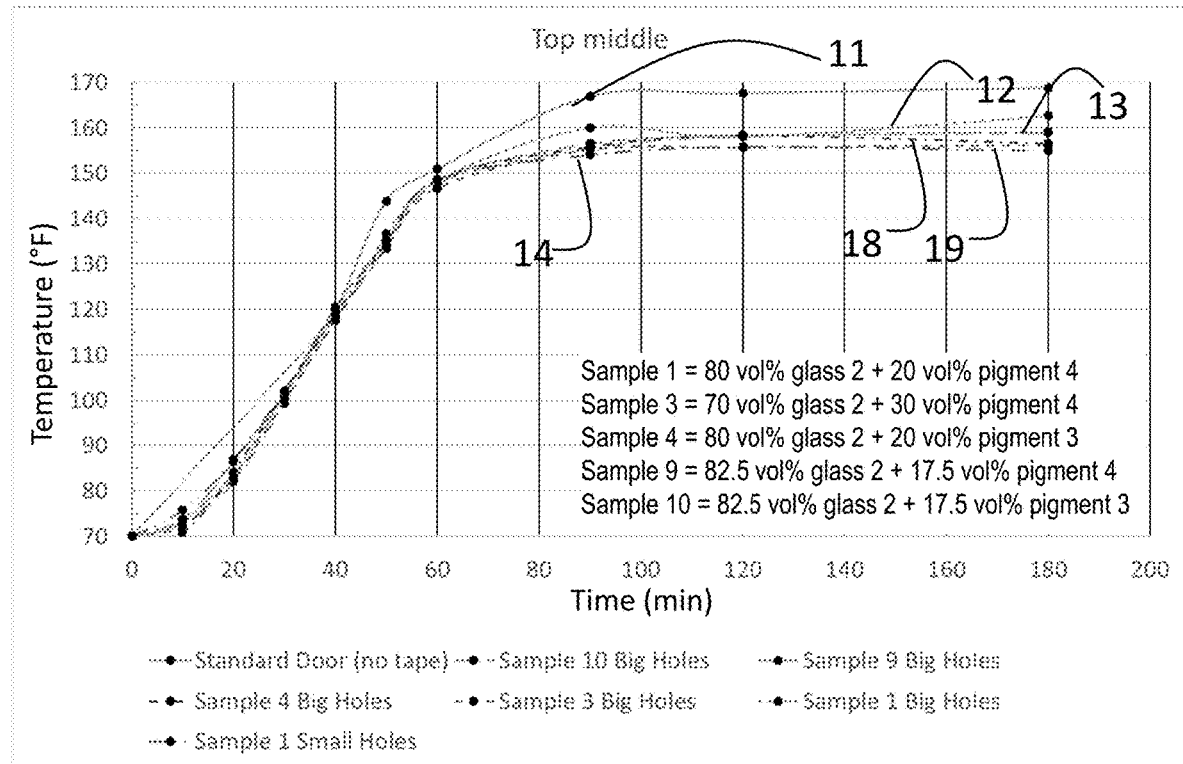
FIG. 17 is a graph of the temperature profile of the temperature of the outer oven glass of various exemplary embodiments and of the comparative example at an operating temperature of the oven of 875° F. (468° C.)

FIG. 16 and FIG. 17 show temperature profiles of the outer surface of several oven doors as a function of operating time, the individual oven doors only differing in the coating of the outer glass sheet. The surface temperatures were determined using the measurement setup shown in FIG. 14, the oven temperature was 246° C. (FIG. 16) and 468° C. (FIG. 17), respectively.

Curve 11 represents the comparative example shown in FIGS. 10 and 12. Curves 12 to 15 and 18 and 19 represent different exemplary embodiments which differ in terms of their pigment content, degree of coverage, and the pattern of the applied decorative coating, and which will be described in Table 5.

The raster pattern has a diameter of 1 mm (small holes) with a total degree of coverage of the layer of 64%, and a diameter of 2 mm (big holes) with a total degree of coverage of the layer of 67%. The reference door has a raster pattern with a diameter of 1.5 mm and a total degree of coverage of the layer of 63%

Table 5 shows the layer compositions of the exemplary embodiments according to curves 12, 13, 14, 15, 18 and 19. Within the viewing area, the glass sheets have a dot pattern with round non-coated areas, also referred to as holes below. Dot raster patterns or dot patterns with different hole sizes were used.

In the dot raster patterns with small holes, the non-coated areas, i.e. the holes in the coating, have a diameter of 1 mm. In this design variant, the outer surface of the glass sheet with the coating has a degree of coverage of 64%.

In the case of dot raster patterns with large holes in the dot raster pattern, the holes or non-coated areas in the dot raster pattern have a diameter of 2 mm. Here, the outer surface of the glass sheet has a degree of coverage of 67%.

In FIG. 16 and in FIG. 17, curve 12 is the temperature profile of sample 1 from table 5 with big holes in the deposited decorative raster pattern, curve 13 is the temperature profile of sample 10 from table 5, curve 14 is the temperature profile of sample 1 from Table 5 with small holes in the deposited decorative raster pattern, curve 19a (only in FIG. 16) corresponds to sample 9 from Table 5 with big holes in the deposited decorative raster pattern, curve 18 is the temperature profile of sample 4 from Table 5, and curve 19 is the temperature profile of sample 3 from table 5.

TABLE 5

Exemplary/comparative examples for the temperature measurements of FIGS. 16 and 17

| Substrate | Unit | SAMPLE 1 transparent floated soda-lime glass | SAMPLE 2 transparent floated soda-lime glass | SAMPLE 3 transparent floated soda-lime glass | SAMPLE 4 transparent floated soda-lime glass | SAMPLE 5 transparent floated soda-lime glass | SAMPLE 9 transparent floated soda-lime glass | SAMPLE 10 transparent floated soda-lime glass |
|---|---|---|---|---|---|---|---|---|
| LAYER COMPOSITION | | | | | | | | |
| Glass (glass # from table 1) | | 2 (80 vol %) | 2 (60 vol %) | 2 (70 vol %) | 2 (80 vol %) | 2 (70 vol %) | 2 (82.5 vol %) | 2 (82.5 vol %) |
| Pigment (pigment # from table 2) | | 4 (20 vol %) | 4 (40 vol %) | 4 (30 vol %) | 3 (20 vol %) | 3 (30 vol %) | 4 (17.5 vol %) | 3 (17.5 vol %) |
| Coating | | screen printing | screen printing | screen printing | screen printing | screen printing | screen printing | screen printing |
| Medium Pasting ratio (powder:organics) | wt % | 10:3.1 | 10:3.1 | 10:3.1 | 10:3.1 | 10:3.1 | 10:3.1 | 10:3.1 |
| Viscosity (immersion-type rotational viscometer) | cPoise | 12,000 | not measured | 10,000 | 11,000 | 11,000 | 13,000 | 11,000 |
| Screen mesh | | 77 | 77 | 77 | 77 | 77 | 77 | 77 |
| Firing | | tempering furnace | tempering furnace | tempering furnace | tempering furnace | tempering furnace | tempering furnace | tempering furnace |
| PROPERTIES OF COATED SUBSTRATE - SINGLE PRINT | | | | | | | | |
| Sclerometer test 10N | | ok | not ok (limit) | ok (limit) | ok | ok (limit) | ok | ok |
| Layer thickness [+/−1 μm] | | 15.0 | 14.0 | 14.5 | 15.5 | 11.0 | 17.0 | 16.0 |
| Optical thickness | | 2.6 | 3.2 | 3.1 | 2.8 | 3.6 | 2.1 | 2.5 |
| Gloss (60°) | | 11 | | 3 | 14 | 2 | | |
| L*a*b* (SCE; on glass side) | | 25.6/ 0.43/0.73 | 8.04/ 0.35/0.97 | 11.2/ 0.08/0.71 | 25.8/ 0.37/1.04 | 10.1/ 0.1/1.07 | 28.6/ 0.05/−0.48 | 26.9/ 0.12/−0.14 |
| Temperature (Tmax) measured after heating for 180 min in oven test | ° F. | small holes: 155.8° F. big holes: 162.7° F. | not measured | big holes: 158.6° F. | big holes: 159.7° F. | | big holes: 159.2° F. | big holes: 159.0° F. |

For all samples, the temperature was measured in measuring area 15 (see FIGS. 12 and 13). Measuring area 15 is the surface area with the comparatively highest temperature.

From FIG. 16 it is apparent that in the exemplary embodiments temperature rises sharply within the measuring area during an operating time of up to about 60 minutes, and after that the temperature does not or only slightly increases. For all the exemplary embodiments, the measured surface temperatures are below the corresponding temperatures of the comparative example.

FIG. 17 shows the temperature versus time profile for an oven temperature of 468° C., i.e. for the pyrolysis mode of the oven, and thus simulates the temperature profile during a pyrolysis process. Here, again, the measured temperatures initially rise steeply within the first 60 minutes and then approach a largely constant value. This value is below the temperature of the comparative example for all of the exemplary embodiments. Even for an operating time of more than 160 minutes, the exemplary embodiments show a maximum temperature of less than 75° C. or less than 165° F. in the measurement area. Furthermore, from curves 12 and 14 it becomes obvious that coated glass sheets with a high degree of coverage will heat up less than corresponding glass sheets with a lower degree of coverage. Curve 12 represents a glass sheet having a raster pattern with which a higher degree of coverage can be achieved than with the glass sheet design with temperature profile 14.

The glass sheets of curves 12 and 19 differ in terms of the pigment content in the coating. Curve 12 represents sample 1 and curve 19 represents sample 3 from table 5. Surprisingly, FIG. 17 shows that coatings with pigment contents of 20 vol % (curve 12) in the coating have a better temperature behavior than sample 3 (curve 19) with a pigment content of 30 vol %. This can be explained by the fact that when making such coatings with high pigment contents, the proportion of IR-reflecting pigments in the corresponding coating is so high that during the firing process a large part of the heat radiation is reflected in the paste by the IR-reflecting pigments and the heat is therefore not available to melt the glass powder or to form a uniform glass flux. This becomes also evident from the scratch resistance of the fired layers. With 30 vol % of pigment, a test with the 10 N sclerometer is just passed. This in turn may have an adverse effect on the optical properties of the layer. Also, homogeneity of the layer or its mechanical or chemical resistance may be adversely affected by an excessive pigment content in the coating. Therefore, preferably, the coating has a pigment content of 10 to 25 vol %, preferably 12 to 20 vol %.

Table 6 summarizes the results of the temperature measurements shown in FIGS. 16 and 17 and gives the surface temperature of the glass sheet after heating for a duration of 180 minutes at 246° C. and 468° C., respectively. Samples 1, 3, 4, 9, and 10 correspond to the samples 1, 3, 4, 9, and 10 listed in Table 5. The comparative sample is a standard oven door, i.e. with normal black pigments. Table 6 shows that the exemplary embodiments exhibit a better insulation effect than the standard door. For example, in the exemplary embodiments the surface temperature measured after 180 minutes at the operating temperature is below the corresponding temperature of the standard oven door in each case. This applies to a heating temperature of 475° F., or 246° C., which simulates the cooking mode, as well as for a heating temperature of 875° F., or 468° C., which corresponds to the temperature in pyrolysis mode. Thus, it can be concluded from Table 6 that the IR-reflecting coating according to the invention is at least equal in terms of its insulating effect to the conventional coatings with transparent conductive oxides.

Figure 18:
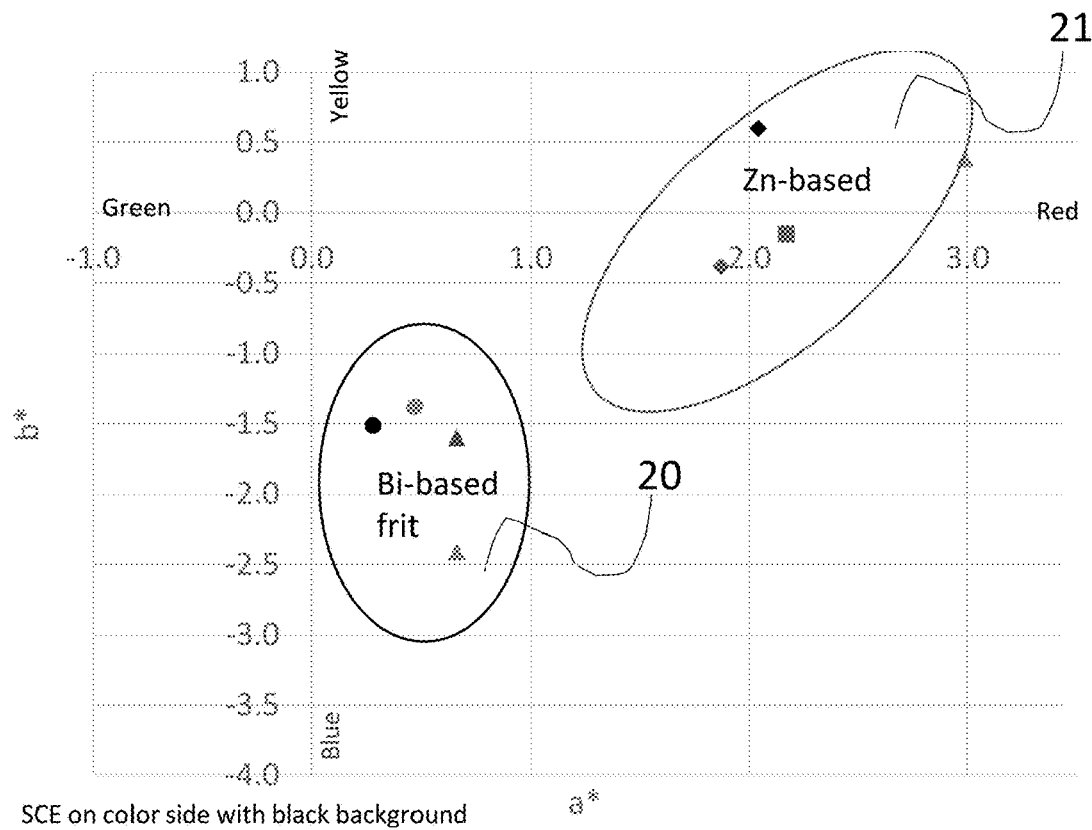
FIG. 18 is a graph illustrating the shift in color coordinates of the coating depending on the glass composition in the coating.

FIG. 18 shows the influence of different glass compositions in the coating on the color coordinates of the coating, as determined using a D65 light source and measured from the color side in compliance with the EN ISO 11664-4 measurement standard. The samples within zone 21 represent coatings with a zinc-based glass matrix, the samples within zone 20 include a bismuth containing glass matrix. It becomes clear from FIG. 18 that coatings with zinc-based glasses exhibit a shift to yellow color coordinates, while the coatings of regime 20 are shifted to blue color coordinates.

Figure 19:
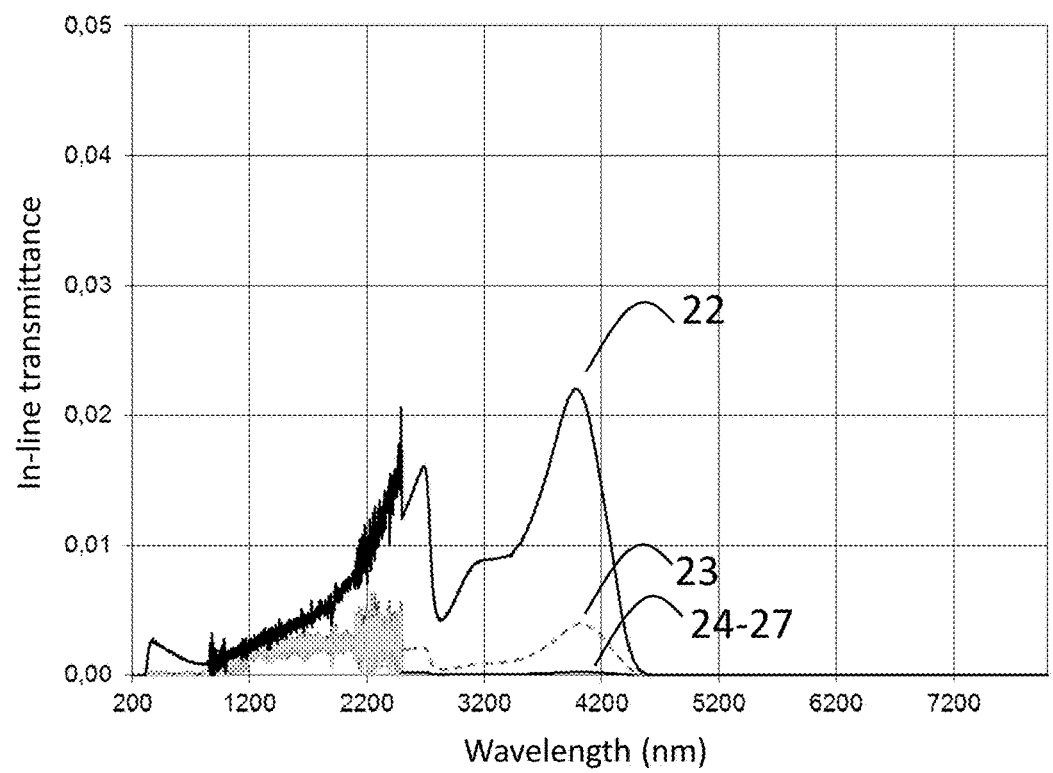
FIG. 19 is a graph showing in-line transmittance profiles of various exemplary embodiments (23 to 27) and of the comparative example (22)

FIG. 19 shows in-line transmittance profiles of several exemplary embodiments (23 to 27) and of the comparative example (22). For in-line transmittance, only the light that passes through the measurement sample at a forward scattering angle of 5° is directed onto the detector, which means that scattered components are not shown in the measurement curve. It is apparent, here, that the in-line transmittance of the exemplary embodiments is below the transmittance of comparative example 22. The substrates coated according to the invention preferably exhibit an in-line transmittance of not more than 0.01% for the wavelength range between 1.5 μm and 4.5 μm.

Figure 20:
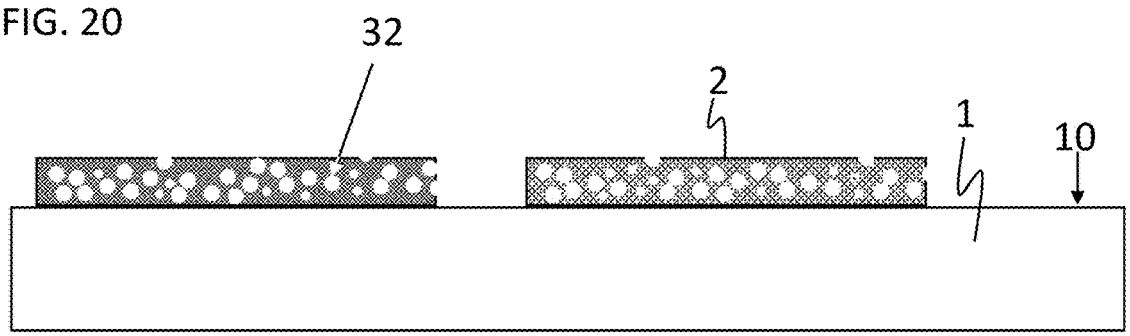
FIG. 20 is a graph illustrating a schematic view of a substrate coated with a porous enamel as an exemplary embodiment, the porous enamel having largely isotropic pores.
Figure 21:
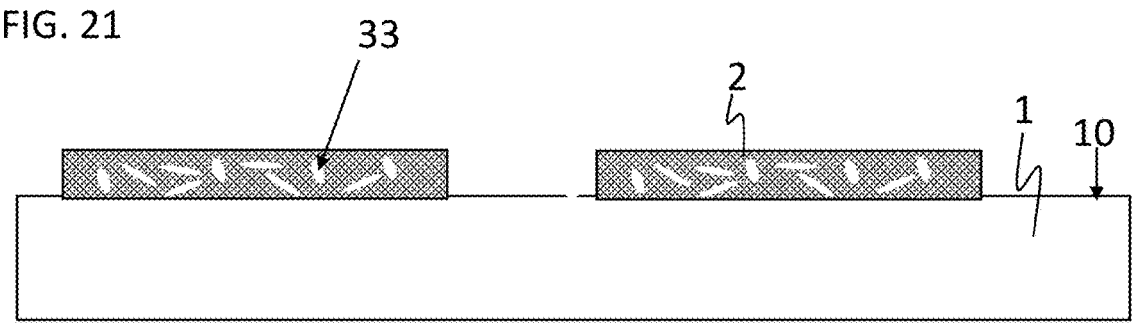
FIG. 21 is a schematic view of a substrate coated with a porous enamel as a further exemplary embodiment, the porous enamel having largely anisotropic pores.

FIGS. 20 and 21 schematically illustrate embodiments in which the coating 2 deposited on the glass 1 includes pores, 32 and 33, respectively. In both cases, these are closed pores. FIG. 20 shows an embodiment with largely spherical pores

TABLE 6

Temperatures of the embodiments shown in table 5, as determined in cooking mode (246° F.) and pyrolysis mode (875° F.)

| Sample | 1 | 3 | 4 | 9 | 10 | Standard door |
|---|---|---|---|---|---|---|
| Temperature measured near the edge after heating for 180 minutes at 475° F./246° C. | 105° F. | — | — | 106° F. | 100° F. | 106° F. |
| Temperature measured in the center of the glass sheet after heating for 180 minutes at 475° F./246° C. | 101° F. | — | — | 103° F. | 96° F. | 104° F. |
| Temperature measured near the edge after heating for 180 minutes at 875° F./468° C. | 142° F. | 139° F. | 140° F. | 140° F. | 139° F. | 146° F. |
| Temperature measured in the center of the glass sheet after heating for 180 minutes at 875° F./468° C. | 147° F. | 142° F. | 146° F. | 144° F. | 146° F. | 155° F. |

32. Such pores may be obtained by using calcium carbonate as a blowing agent, for example. In contrast, the pores 33 shown in FIG. 21 have an elliptical cross-sectional shape and hence an anisotropic structure. Pores with such a shape may be obtained by using rice starch as a blowing agent, for example.

The pores may be of different size and shapes, i.e., more generally, are not limited by the example schematically illustrated here and need not be spherical.

| Pore former | Pore size (μm) | Pore shape |
|---|---|---|
| CaCO₃ | 5-30 | roundish |
| Sodium hydrogen phosphates | 5-30 | roundish |
| Rice starch | 0.1-5 | elongated |
| Potato starch | 10-15 | ovoid potato-shaped |
| Wheat starch | 2-10 | grain-shaped |

Figure 22:
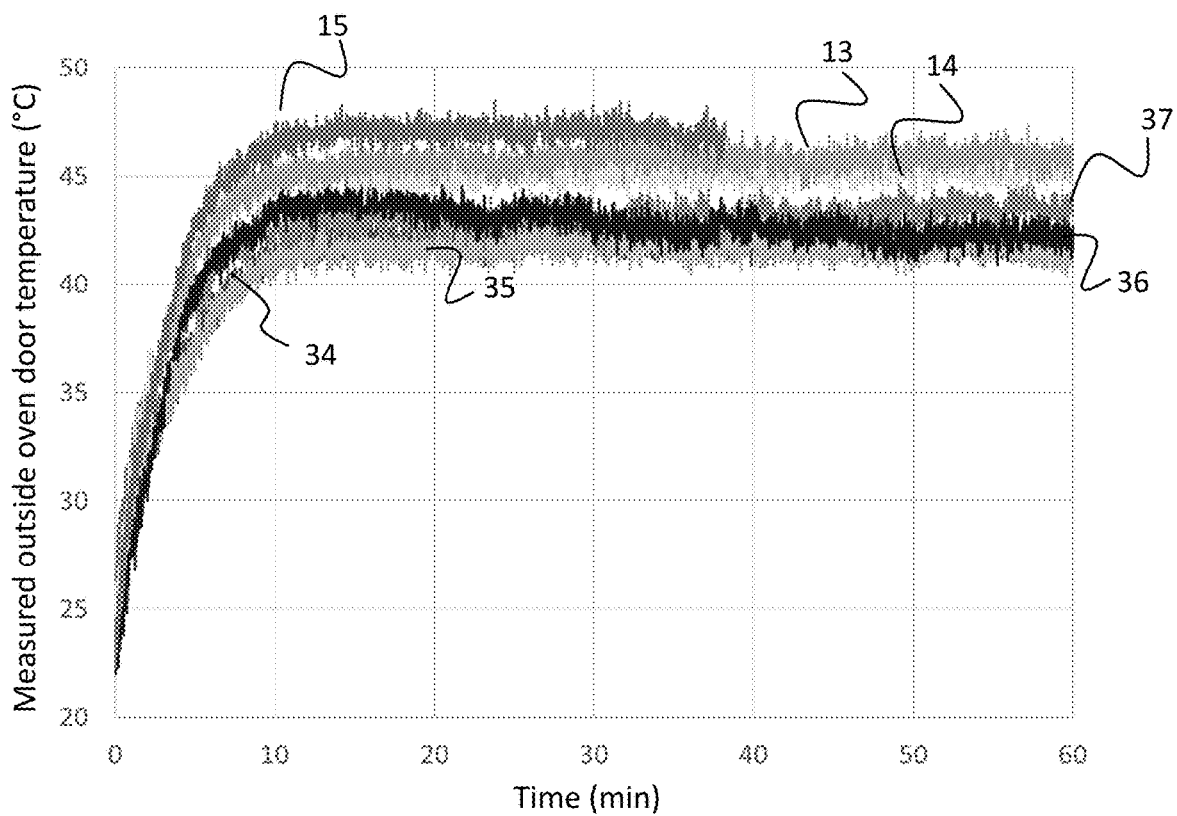
FIG. 22 is a graph showing the temperature profile of the measured maximum temperature of the outer oven glass of various exemplary embodiments which differ with regard to the porosity of the coating at an operating temperature of the oven of 450° C.
Figure 23:
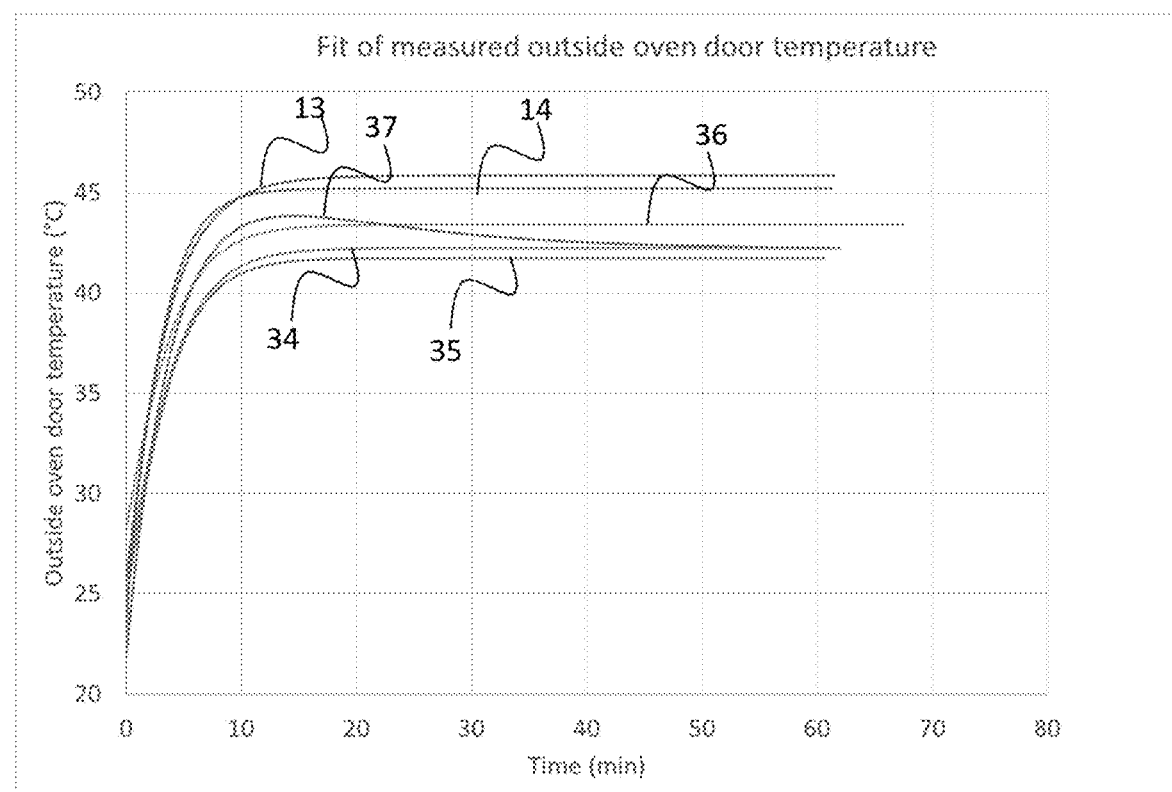
FIG. 23 shows the averaged values of the temperature profiles of FIG. 22.

FIGS. 22 and 23 show temperature profiles of the outer surface of several oven doors as a function of operating time for different exemplary embodiments. The individual oven doors differed only in the coating of the outer glass sheet. For FIGS. 22 and 23, a laboratory oven was heated to a temperature of 450° C. and subsequently the surface temperature of the coated glass sheet was determined as a function of operating time using the measurement device shown in FIG. 15.

FIG. 22 shows the maximum temperatures measured in this way, as a function of operating time of the oven. FIG. 23 shows a fit obtained by averaging (logistic curve fit with 3 parameters) of the temperature profiles shown in FIG. 22.

Curves 13, 14, and 15 (as samples 1, 9, 10 also measured in the form of a printed oven door, see above) correspond to temperature profiles of exemplary embodiments in which the IR-reflecting coating is largely free of pores, and curves 34 to 37 are temperature profiles of embodiments with porous IR-reflective coatings.

The individual exemplary embodiments are characterized in more detail in Table 7.

determined on the outer surface of the glass sheet is below 50° C. With the exemplary embodiments 34 to 37 in which the IR-reflecting pigments are provided within an enamel that has closed pores, this maximum temperature can be further reduced. It is assumed that the pores within the coating represent structures on which the IR radiation can additionally be scattered.

The manifestation of this positive effect for the maximum surface temperature of the glass sheet depends on the shape of the pores. The blowing agent used in samples 36 and 37 was rice starch, while CaCO₃ was used in samples 34 and 35. When rice starch is used as a blowing agent, anisotropic pores with an ellipsoidal cross section will preferably be formed, while the use of CaCO₃ as a blowing agent leads to largely spherical pores.

FIG. 23 shows that for the coated glasses 34 and 35 which have pores of spherical or largely spherical shape, the insulation effect is higher than for the coated glasses 36 and 37 that have a coating with ellipsoidal or rice-shaped pores.

FIG. 23 moreover shows that the percentage of blowing agent in the paste has an impact on the IR reflection of the corresponding coating. Samples 34 and 35 only differ in their content of blowing agent. While the amount of blowing agent in the paste for producing coating 34 is 20 vol %, the corresponding paste for producing coating 35 contains only 10 vol % of CaCO₃ as the blowing agent. Sample 35 exhibits a better insulation effect than sample 34, so that under comparable conditions and after an operating time of 180 minutes the maximum temperature of sample 35 is lower than the maximum temperature of sample 34 by 0.8° C.

An excessive amount of blowing agents in the paste results in a formation of so many pores that they in part combine so that open pores are created. An indication of open pores is an uneven surface associated therewith. It is assumed here that closed pores promote IR reflectance.

If the substrate is in the form of a transparent, non-volume-stained substrate, the barrier effect of the coating can, for example, be determined by a test in which a drop of a fluid medium such as water is applied to the coating and

TABLE 7

Characterization of the samples shown in FIGS. 22 and 23

| Curve | Pigment (vol %) | Blowing agent (vol %) | Type of blowing agent | $T_{max}$ (° C.) after 1 h at 450° C. | Optical density (glass side facing upwards) | L*a*b* (SCE; coated side facing upwards) | Gloss (60°) | Sclerometer (10N) | Sidolin test (porosity) |
|---|---|---|---|---|---|---|---|---|---|
| 13 | 20 | 0 | N/A | 47.6 | 2.6 | 34.63/0.45/−3.71 | 18.5 | ok | very good |
| 14 | 17.5 | 0 | N/A | 46.9 | 2.1 | 36.04/0.44/−4.09 | 55.9 | ok | very good |
| 34 | 17.5 | 20 | CaCO₃ | 43.8 | 2.2 | 34.63/0.45/−3.71 | 4.0 | ok | good |
| 35 | 17.5 | 10 | CaCO₃ | 43.2 | 2.6 | 31.58/0.49/−3.56 | 17.5 | ok | good |
| 36 | 17.5 | 20 | rice starch | 45.7 | 2.1 | 21.38/0.6/−1.75 | 41.0 | ok | very good |
| 37 | 17.5 | 10 | rice starch | 45.4 | 2.6 | 18.56/0.65/−1.95 | 50.5 | ok | very good |

Samples 13 and 14 correspond to the exemplary embodiments shown in FIGS. 16 and 17. The coatings of these exemplary embodiments were produced without using blowing agents. Samples 34 to 37, by contrast, are porous coatings. For producing these coatings, blowing agents were used as listed in table 7, and therefore the coatings obtained in this way include closed pores. All of the temperature profiles shown in FIGS. 22 and 23 were obtained using the measurement setup shown in FIG. 15. The respective coating compositions were applied to the substrate by screen printing using a 77/55 T screen.

From FIG. 23 it is apparent that even after the oven has been in operation for one hour at 450° C., the temperature allowed to act for at least 10 seconds and is then wiped off, and the test is passed if the area of action of the drop is not discernable as such when the coating is viewed through the substrate.

Such test procedures are generally known under the term visual inspection and are based on the relevant standards, such as DIN EN 1330-10, DIN 25435-2, and DIN EN 13018. In the present case, direct or indirect visual inspection by an inspecting person is preferred. In the case of direct visual inspection, the inspection is performed with a non-interrupted beam path between the eye of the inspecting person and the surface to be tested, whereas in the case of an indirect visual inspection, the beam path is interrupted by capturing the surface to be tested by suitable photo or video equipment. Furthermore, local visual inspection in compliance with DIN EN 13018 is preferred, which defines minimum illuminance, a distance to the surface to be tested, and a viewing angle of the inspecting person.

The minimum illuminance employed for the inspection is at least 500 lx on the test surface from a distance of less than 600 mm. The viewing angle of the examiner is at least 30°. The examiner preferably satisfies the requirements set out in the relevant standards, such as DIN EN 13018 and EN 473.

Such a test procedure is particularly preferred because it can be easily adapted to the respective fields of application of the coated glass or glass ceramic substrates. For example, the duration of exposure is usually chosen as a function of the considered fluid medium and may also be more than 10 seconds.

For the purposes of the present disclosure, fluids preferably include liquids, in particular water, aqueous liquids, alcohols, liquids based on these liquids or liquids comprising these liquids, such as glass cleaning agents, and/or oils, and water vapor.

case, if it exhibits no color change on the front side and shows a wipeable border on the rear side in the test. Another way of increasing IR reflectance of the coating is to increase layer thickness, for example by repeatedly applying the corresponding paste or suspension to the substrate.

Figure 24:
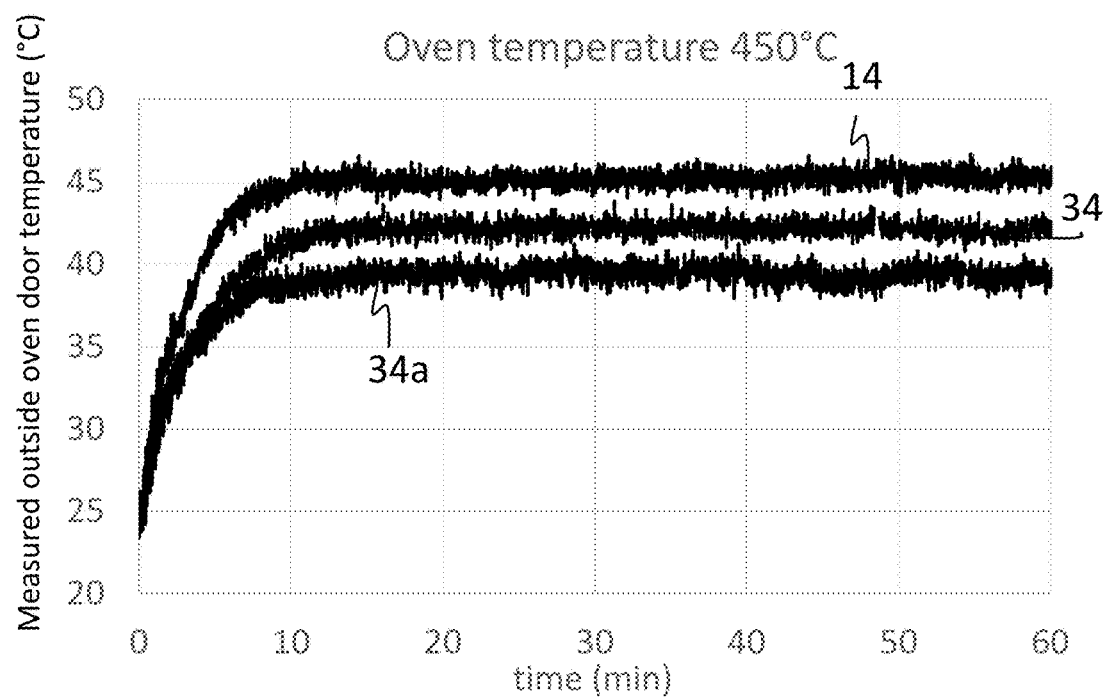
FIG. 24 is a graph of the measured profiles of maximum temperature of the outer oven door glass at an operating temperature of the oven of 450° C., for which the decorative layers of different layer thicknesses were applied prior to firing.

FIG. 24 shows the influence of the layer thickness of the applied coating on the IR reflectance thereof. Here, samples 14 (non-foamed coating as comparison sample), 34, and 38 were applied to the substrate by screen printing using a 77T screen. The coatings of samples 14 and 34 were applied in a single print, the coating of sample 38 was applied to the substrate as a double print, by two printing processes. Samples 34 and 38 differed only in the number of printing processes. It can be seen here that the maximum temperature can be reduced by more than 2° C. by increasing the layer thickness. Further measurement results are described in the table below which indicates the number of printing processes (single or double print) and the maximum temperature determined with the measurement setup shown in FIG. 15 on the outer surface of the glass sheet after 60 minutes of operation of the oven at a temperature of 450° C.

| Sample ID | Number of prints | Percentage of pigment [vol %] | Percentage of blowing agent [vol %] | Blowing agent used | $T_{max}$ (° C.) after 1 h of heating at 450° C. | Optical density (glass side facing upwards) | L*a*b* (coated side facing upwards) | Gloss (60°) | Sclerometer (10N) | Sidolin test (porosity) |
|---|---|---|---|---|---|---|---|---|---|---|
| 34 | 1 | 17.5 | 20 | CaCO$_3$ | 43.8 | 2.2 | 34.63/0.45/−3.71 | 4.0 | ok | good |
| 34a | 2 | 17.5 | 20 | CaCO$_3$ | 41.3 | 3.2 | 36.04/0.44/−4.09 | 1.4 | ok | good |
| 36 | 1 | 17.5 | 20 | rice starch | 45.7 | 2.1 | 21.38/0.6/−1.75 | 41.0 | ok | very good |
| 36a | 2 | 17.5 | 20 | rice starch | 45.2 | 4.2 | 23.49/0.42/−2.15 | 35.4 | ok | very good |
| 37 | 1 | 17.5 | 10 | rice starch | 45.4 | 2.6 | 18.56/0.65/−1.95 | 50.5 | ok | very good |
| 37a | 2 | 17.5 | 10 | rice starch | 44.9 | 4.7 | 19.86/0.40/−2.38 | 48.9 | ok | very good |

A preferred procedure for carrying out a visual inspection by an inspecting person as explained above with the aim of determining water-tightness or moisture-tightness of a coating according to the present disclosure comprises the steps of: applying a liquid, in particular a drop thereof, onto a surface area of the coating of the substrate; allowing the liquid to act for a duration of 15 seconds; wiping off residual moisture of the liquid using a dry cloth; turning over the substrate so that the coating is disposed on the side of the substrate facing away from the inspecting person; and verifying, by visual inspection, whether a color change is recognizable in this area or in an area adjacent to this area, wherein
a) the visual inspection is performed under daylight according to standard illuminant D65 or under lighting of an incandescent lamp, compact fluorescent lamp, fluorescent lamp, or light-emitting diode;
b) illuminance is at least 500 lx at a distance of less than 600 mm from the coating, i.e. from the inspected area; and
c) the viewing angle of the inspecting person is between 5° and 90°, preferably at least 30°, wherein when the coating is viewed through the substrate, the area of action of the drop is not disruptively noticeable and in particular not discernable as such.

The visual inspection mentioned above, which is also referred to as a "Sidolin test" in the table above, comprises in particular the examination of whether a water mark and/or a water stain is visible from the side of the substrate opposite the coated side. In the test listed in the table above, glass cleaner was used as the test liquid.

Here, a layer is characterized as very good, if it exhibits no color change on the front side nor on the rear side when inspected. A layer is characterized as good in the present

The invention claimed is:

1. A coated glass or glass ceramic substrate, comprising:
a substrate with a surface area; and
a coating on the surface area in a laterally patterned form with a layer thickness from 3 to 35 μm and covering at least 60% of an entirety of the surface area, the coating including a glass matrix and IR-reflecting pigments,
wherein the IR-reflecting pigments have a TSR value of at least 20%, as determined according to ASTM G 173,
wherein, at a wavelength of 1500 nm, the coating exhibits a remission of at least 35%, as measured according to ISO 13468,
wherein the surface area has no other coating containing conductive oxides selected from a group consisting of indium tin oxide, fluorine tin oxide, aluminum zinc oxide, and antimony tin oxide,
wherein the IR-reflecting pigments comprise particles with a size distribution having a d50 value in a range from 0.5 μm to 2 μm, and
wherein the laterally patterned form comprises a raster or dot pattern.

2. The coated glass or glass ceramic substrate of claim 1, wherein the surface area has no other coating containing any conductive oxides.

3. The coated glass or glass ceramic substrate of claim 1, wherein the substrate has no other coating containing any conductive oxides.

4. The coated glass or glass ceramic substrate of claim 1, wherein at least 65% of the surface area is coated with the coating.

5. The coated glass or glass ceramic substrate of claim 1, wherein, in a wavelength range from 1500 nm to 2500 nm, the coating exhibits a remission of at least 35%, as measured according to ISO 13468.

6. The coated glass or glass ceramic substrate of claim 1, wherein the IR-reflecting pigments comprise particles having a specific surface area in a range from 1.1 to 8 m²/g.

7. The coated glass or glass ceramic substrate of claim 1, wherein the TSR value is at least 25%.

8. The coated glass or glass ceramic substrate of claim 1, wherein the IR-reflecting pigments are selected from a group consisting of a chromium containing iron oxide, a chromium containing hematite, a chromium containing spinel, and any combinations thereof.

9. The coated glass or glass ceramic substrate of claim 1, wherein the coating has a content of less than 500 ppm of conductive oxides.

10. The coated glass or glass ceramic substrate of claim 1, wherein the coating comprises closed pores.

11. The coated glass or glass ceramic substrate of claim 10, wherein the coating is resistant to temperatures greater than 400° C.

12. The coated glass or glass ceramic substrate of claim 10, wherein the coating is substantially inorganic.

13. The coated glass or glass ceramic substrate of claim 10, wherein, in a temperature range from 20° C. to 700° C., the coating and the substrate have coefficients of thermal expansion that do not differ from one another by more than $4*10^{-6}$/K.

14. The coated glass or glass ceramic substrate of claim 1, wherein the substrate is selected from a group consisting of a soda-lime glass, a borosilicate glass, and a thermally toughened glass.

15. The coated glass or glass ceramic substrate of claim 1, wherein the glass matrix comprises 8 to 70 wt % of bismuth oxide and/or 0.1 to 0 wt % of zinc oxide.

16. The coated glass or glass ceramic substrate of claim 1, wherein the glass matrix comprises a glass composition, in wt %:

| | |
|---|---|
| $SiO_2$ | 30-75, |
| $Al_2O_3$ | 0-25, |
| $B_2O_3$ | 0-30, |
| $Li_2O$ | 0-12, |
| $Na_2O$ | 0-25, |
| CaO | 0-12, |
| MgO | 0-9, |
| BaO | 0-27, |
| SrO | 0-4, |
| ZnO | 0-35, |
| $Bi_2O_3$ | 0-5, |
| $TiO_2$ | 0-10, |
| $ZrO_2$ | 0-7, |
| $As_2O_3$ | 0-1, |
| $Sb_2O_3$ | 0-1.5, |
| F | 0-3, |
| Cl | 0-1, and |
| $H_2O$ | 0-3. |

17. The coated glass or glass ceramic substrate of claim 1, wherein the glass matrix comprises a glass composition, in wt %:

| | |
|---|---|
| $SiO_2$ | 6-65, |
| $Al_2O_3$ | 0-20, |
| $B_2O_3$ | 0-40, |
| $Li_2O$ | 0-12, |
| $Na_2O$ | 0-18, |
| $K_2O$ | 0-17, |
| CaO | 0-17, |
| MgO | 0-12, |
| BaO | 0-38, |
| SrO | 0-16, |
| ZnO | 0-70, |
| $TiO_2$ | 0-5, |
| $ZrO_2$ | 0-5, |
| $B_iO_3$ | 0-75, |
| CoO | 0-5, |
| $Fe_2O_3$ | 0-5, |
| MnO | 0-10, |
| $CeO_2$ | 0-3, |
| F | 0-3, |
| Cl | 0-1, and |
| $H_2O$ | 0-3. |

18. The coated glass or glass ceramic substrate of claim 1, wherein the IR-reflecting pigments are present in the coating in a proportion from 15 to 55 wt % and/or wherein the glass matrix is present in the coating in a proportion of from 45 to 85 wt %.

19. The coated glass or glass ceramic substrate of claim 1, wherein the IR-reflecting pigments comprise at least a first and a second IR-reflecting pigment, wherein the second IR-reflecting pigment is selected from a group consisting of a cobalt chromite spinel, an indium manganese yttrium oxide, a niobium sulfur tin zinc oxide, a tin zinc titanate, a cobalt titanate spinel, and any combinations thereof, and/or the second IR-reflecting pigment is present in the coating in a proportion from 0.75 to 18.5 wt %.

20. The coated glass or glass ceramic substrate of claim 1, wherein the coating is directly on the surface area of the substrate.

21. The coated glass or glass ceramic substrate of claim 1, wherein the substrate is configured as a door of a cooking oven or a viewing window of a fireplace.

22. An oven door, comprising:
an inner glass sheet; and
an outer glass sheet, wherein the outer glass sheet is a coated glass or glass ceramic substrate comprising:
a substrate with a surface area; and
a coating on the surface area in a laterally patterned form with a layer thickness from 3 to 35 μm and covering at least 60% of an entirety of the surface area, the coating including a glass matrix and IR-reflecting pigments,
wherein the IR-reflecting pigments have a TSR value of at least 20%, as determined according to ASTM G 173,
wherein, at a wavelength of 1500 nm, the coating exhibits a remission of at least 35%, as measured according to ISO 13468,
wherein the surface area has no other coating containing conductive oxides selected from a group consisting of indium tin oxide, fluorine tin oxide, aluminum zinc oxide, and antimony tin oxide,
wherein the IR-reflecting pigments comprise particles with a size distribution having a d50 value in a range from 0.5 μm to 2 μm, and
wherein the laterally patterned form comprises a raster or dot pattern.

23. The oven door of claim 22, wherein the coating on the outer glass sheet faces towards the inner glass sheet.

24. The oven door of claim 22, further comprising an intermediate glass sheet between the inner and outer glass sheets, wherein the intermediate glass sheet is the coated glass or glass ceramic substrate.

25. The oven door of claim 24, wherein the surface area of the intermediate glass sheet has the coating on both sides of the intermediate glass sheet facing the inner and outer glass sheets.

* * * * *